(12) United States Patent
Davidson et al.

(10) Patent No.: US 11,659,140 B2
(45) Date of Patent: May 23, 2023

(54) PARITY-BASED REDUNDANT VIDEO STORAGE AMONG NETWORKED VIDEO CAMERAS

(71) Applicant: Western Digital Technologies, Inc., San Jose, CA (US)

(72) Inventors: Matthew Davidson, Los Altos, CA (US); Ramy Ayad, East Brunswick, NJ (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/361,532

(22) Filed: Jun. 29, 2021

(65) Prior Publication Data

US 2022/0417473 A1    Dec. 29, 2022

(51) Int. Cl.
| | | |
|---|---|---|
| *H04N 7/18* | (2006.01) | |
| *H04N 5/232* | (2006.01) | |
| *H04N 7/56* | (2006.01) | |
| *H04N 23/661* | (2023.01) | |

(52) U.S. Cl.
CPC ............... *H04N 7/181* (2013.01); *H04N 7/56* (2013.01); *H04N 23/661* (2023.01)

(58) Field of Classification Search
CPC ...... H04N 5/23206; H04N 7/181; H04N 7/56; G06F 11/1076; G06F 13/1657; G06F 16/27; G08B 13/19667
See application file for complete search history.

(56) References Cited

U.S. PATENT DOCUMENTS

| | | | |
|---|---|---|---|
| 8,521,955 B2 | 8/2013 | Arulambalam et al. | |
| 10,009,575 B1* | 6/2018 | Liu | .................... H04N 5/956 |
| 2004/0126100 A1 | 7/2004 | Ito et al. | |
| 2005/0022052 A1* | 1/2005 | Moulton | ............ G06F 11/1076 714/E11.034 |
| 2006/0171695 A1* | 8/2006 | Jung | ...................... H04N 5/247 396/56 |
| 2008/0288986 A1* | 11/2008 | Foster | ................ H04N 21/4367 348/E7.086 |
| 2012/0317356 A1* | 12/2012 | Ignatowski | ......... G06F 13/1657 711/E12.001 |
| 2013/0332420 A1* | 12/2013 | Ha | ........................ H04N 7/181 707/634 |

OTHER PUBLICATIONS

International Search Report and Written Opinion for International Application No. PCT/US2022/016780, dated Jun. 2, 2022, 11 pgs.

* cited by examiner

*Primary Examiner* — Twyler L Haskins
*Assistant Examiner* — Akshay Trehan
(74) *Attorney, Agent, or Firm* — Patent Law Works LLP

(57) ABSTRACT

Systems and methods for redundant storage among networked video cameras are described. Video data for a group of video cameras is received by a parity video camera. The parity video camera calculates parity across the peer video data, stores the parity data to one storage location and backup video data for the storage location to another storage location. In some examples, the storage locations are selected from among the non-volatile memory of the group of video cameras or another group of video cameras.

20 Claims, 9 Drawing Sheets

PARITY-BASED REDUNDANT VIDEO STORAGE AMONG NETWORKED VIDEO CAMERAS

TECHNICAL FIELD

The present disclosure generally relates to video surveillance systems and, more particularly, to redundant storage of video data in camera non-volatile memory.

BACKGROUND

Network-based video surveillance systems are a growing computing application in both business and personal markets. Some video surveillance systems may include one or more video cameras communicatively connected to a server, such as a network video recorder, through a wired interface, wired or wireless local area network, or wired or wireless wide area network, such as the internet. As video is recorded by the cameras, it is forwarded to the server system where it is stored and/or analyzed for subsequent retrieval. Client or user systems are communicatively connected to the server system to request, receive, and display streams of recorded video data and/or related alerts and analytics.

An increasing number of video surveillance systems are using smart video cameras or otherwise moving compute and storage resources to edge devices in the system, rather than relying solely on a network video recorder appliance or cloud-based processing. For example, some video cameras may be configured with processors, memory, and storage resources far exceeding those needed to convert signals from video image and/or audio sensors into a desired video format for transmission to the network video recorder. However, even these increased compute resources may be limited by space, cost, and other considerations and are unlikely to match the compute resources available in a network video recorder, let alone cloud-based video processing servers.

Similarly, in camera storage, such as secure digital (SD) cards, may increase the potential for data loss due to data storage device failure, camera failure, and/or cameras being damaged or stolen. It may be advantageous to provide redundant in-camera storage of video data in a network-based surveillance system. However, increasing in-camera storage for simple replication (doubling the storage requirements of each video camera) may be undesirable from a cost and system engineering perspective.

Systems and methods for selectively using parity-based redundant video storage among a group of networked video cameras may be advantageous. A reliable and efficient way of calculating and storing parity data to allow recovery of in-camera video data, particularly in edge video surveillance devices, may be needed.

SUMMARY

Various aspects for parity-based redundant video storage among a group of networked video cameras are described.

One general aspect includes a system including a first video camera that include: at least one image sensor configured to capture video images; a network interface configured for communication with a first plurality of peer video cameras over a network; a non-volatile memory configured to store source video data captured by the at least one image sensor; and a controller configured to receive peer video data from the first plurality of peer video cameras, determine, based on the peer video data, parity data, and store the parity data in the non-volatile memory.

Implementations may include one or more of the following features. The system may further include the first plurality of peer video cameras, where the first plurality of peer video cameras and the first video camera may include a first camera group and a second plurality of video cameras, where the second plurality of video cameras may include a second camera group configured for communication over the network. The controller of the first video camera may be further configured to send, to a target video camera among the second plurality of video cameras, first camera group backup data may include at least one of the source video data for the first video camera or the parity data for the first camera group. The controller of the first video camera may be further configured to: receive, from the second camera group, second camera group backup data may include at least one of video data from the second camera group or parity data for the second camera group; and store, in the non-volatile memory of the first video camera, the second camera group backup data. The controller of the first video camera may be further configured to: establish secure network communication with a video storage server; and send, to the video storage server, first camera group backup data may include at least one of the source video data for the first video camera or the parity data for the first camera group. The peer video data may include a compressed video stream from each peer video camera of the first plurality of peer video cameras. Each peer video camera of the first plurality of peer video cameras may be configured to: generate the compressed video stream using variable compression; determine a parity chunk size; determine a chunk synchronization event signaling an end of a data collection time window; and send, responsive to the chunk synchronization event, a video data chunk corresponding to the compressed video stream data generated during the data collection time window. The controller of the first video camera may be further configured to determine the parity data for a parity chunk based on the video data chunk from each peer video camera for the data collection time window. The controller may be further configured to pad the video data chunk from each peer video camera to meet the parity chunk size prior to determining the parity data for the parity chunk. Each peer video camera of the first plurality of peer video cameras may be further configured to: determine a start timestamp for the data collection time window; buffer, to a data buffer, the compressed video stream starting from the start timestamp; monitor a valid data size of the compressed video stream in the data buffer; and selectively send, responsive to the valid data size for that peer video camera meeting the parity chunk size, a chunk synchronization notification to each other peer video camera. The chunk synchronization notification may signal the chunk synchronization event for each peer video camera and include an end timestamp for the data collection time window. Each peer video camera of the first plurality of peer video cameras may be further configured to send, to the first video camera a valid data size for the video data chunk. The controller of the first video camera may be further configured to store a parity chunk record for the parity chunk in a parity management log. The parity chunk record may include a start timestamp for the data collection time window and, for each video data chunk used to determine the parity chunk, the valid data size for that video data chunk. The controller of the first video camera may be further configured to: determine, for a first data collection time window, a first parity block for the parity data of the first plurality of peer video cameras; store the first parity block in the non-volatile memory; send the source video data for the first data collection time window to a first target peer video camera in the first plurality of peer video cameras; determine, for a second data collection time window, a second parity block for the parity data of the first plurality of video cameras; send the second parity block to the first target peer video camera; and send a video data chunk from the first target peer video camera in the second data collection time window to a second target peer video camera in the first plurality of peer video cameras. The first plurality of peer video cameras and the first video camera may comprise a first camera group. Each video camera in the first camera group may be configured to, for a plurality of data collection time windows: determine, for a selected data collection time window, a parity camera from the first camera group; store, at the determined parity camera, parity data for the selected data collection time window; determine, for the selected data collection time window, a backup camera from the first camera group; and send, from the parity camera to the backup camera, backup data corresponding to the selected data collection time window. The first camera group may determine the parity camera for each data collection time window to distribute the parity blocks among video cameras in the first camera group the backup camera for each data collection time window to distribute the backup data to a different video camera than a video camera storing corresponding parity data.

Another general aspect includes a computer-implemented method that includes: generating, by a first plurality of peer video cameras, peer video data; storing, by the first plurality of peer video cameras, the peer video data in non-volatile memories of the first plurality of peer video cameras; receiving, by a parity video camera and over a network, peer video data from the first plurality of peer video cameras; determining, by the parity video camera and based on the peer video data, parity data for first plurality of peer video cameras; and storing, by the parity video camera, the parity data in a non-volatile memory of the parity video camera.

Implementations may include one or more of the following features. The computer-implemented method may include sending, to a target video camera among a second plurality of video cameras, first camera group backup data may include at least one of source video data for the parity video camera or the parity data for the first camera group. The first plurality of peer video cameras and the parity video camera may include a first camera group and the second plurality of video cameras may include a second camera group configured for communication over the network. The computer-implemented method may include: establishing, from the parity video camera, secure network communication with a video storage server; and sending, by the parity video camera and to the video storage server, first camera group backup data may include at least one of source video data for the first video camera or the parity data for the first camera group. The computer-implemented method may include: determining a parity chunk size; generating, by each peer video camera of the first plurality of peer video cameras, a compressed video stream using variable compression; determining a chunk synchronization event signaling an end of a data collection time window; sending, by each peer video camera of the first plurality of peer video cameras and responsive to the chunk synchronization event, a video data chunk corresponding to compressed video stream data generated during the data collection time window; and determining, by the parity video camera, the parity data for a parity chunk based on the video data chunk from each peer video camera for the data collection time window. The computer-implemented method may include padding the video data chunk from each peer video camera to meet the parity chunk size prior to determining the parity data for the parity chunk. The computer-implemented method may include: determining a start timestamp for the data collection time window; buffering, to a data buffer in each peer video camera of the first plurality of peer video cameras, the compressed video stream starting from the start timestamp; monitoring, by each peer video camera of the first plurality of peer video cameras, a valid data size of the compressed video stream in the data buffer; and selectively sending, by at least one peer video camera of the first plurality of peer video cameras and responsive to the valid data size for that peer video camera meeting the parity chunk size, a chunk synchronization notification to each other peer video camera. The chunk synchronization notification may signal the chunk synchronization event for each peer video camera and include an end timestamp for the data collection time window. The computer-implemented method may include: sending, to the parity video camera by each peer video camera of the first plurality of peer video cameras a valid data size for the video data chunk; and storing, by the parity video camera, a parity chunk record for the parity chunk in a parity management log, where the parity chunk record includes a start timestamp for the data collection time window and, for each video data chunk used to determine the parity chunk, the valid data size for that video data chunk. The computer-implemented method may include: determining, by the parity video camera and for a first data collection time window, a first parity block for the parity data of the first plurality of peer video cameras; storing, by the parity video camera, the first parity block in the non-volatile memory of the parity video camera; sending, by the parity video camera, source video data generated by the parity video camera for the first data collection time window to a first target peer video camera in the first plurality of peer video cameras; determining, by the parity video camera and for a second data collection time window, a second parity block for the parity data of the first plurality of video cameras; sending, by the parity video camera, the second parity block to the first target peer video camera; and sending, by the parity video camera, a video data chunk from the first target peer video camera in the second data collection time window to a second target peer video camera in the first plurality of peer video cameras. The computer-implemented method may include, for a plurality of data collection time windows: determining the parity video camera for a first camera group may include the first plurality of peer video cameras and the parity video camera; determining parity blocks for the first camera group; distributing the parity blocks among video cameras in the first camera group; and distributing, based on distributing a parity block to a video camera in the first camera group, backup data for a video data block of that video camera to a different video camera in the first camera group.

Still another general aspect includes a video camera that includes at least one image sensor configured to capture video images; a network interface configured for communication with a first plurality of peer video cameras over a network; a non-volatile memory configured to store source video data captured by the at least one image sensor; means for receiving peer video data from the first plurality of peer video cameras; means for determining, based on the peer video data, parity data; and means for storing the parity data in the non-volatile memory.

The various embodiments advantageously apply the teachings of computer-based video surveillance systems to improve the functionality of such computer systems. The various embodiments include operations to overcome or at least reduce the issues previously encountered in surveillance systems and, accordingly, are more reliable and/or cost-efficient than other surveillance systems. That is, the various embodiments disclosed herein include hardware and/or software with functionality to improve redundant on-camera storage of video data for a group of video cameras supporting remote access, such as through a video surveillance as a service (VSaaS) server and/or end user video surveillance application without requiring mass video data transfer and storage off camera. Accordingly, the embodiments disclosed herein provide various improvements to network-based video surveillance systems.

It should be understood that language used in the present disclosure has been principally selected for readability and instructional purposes, and not to limit the scope of the subject matter disclosed herein.

DETAILED DESCRIPTION

Figure 1:
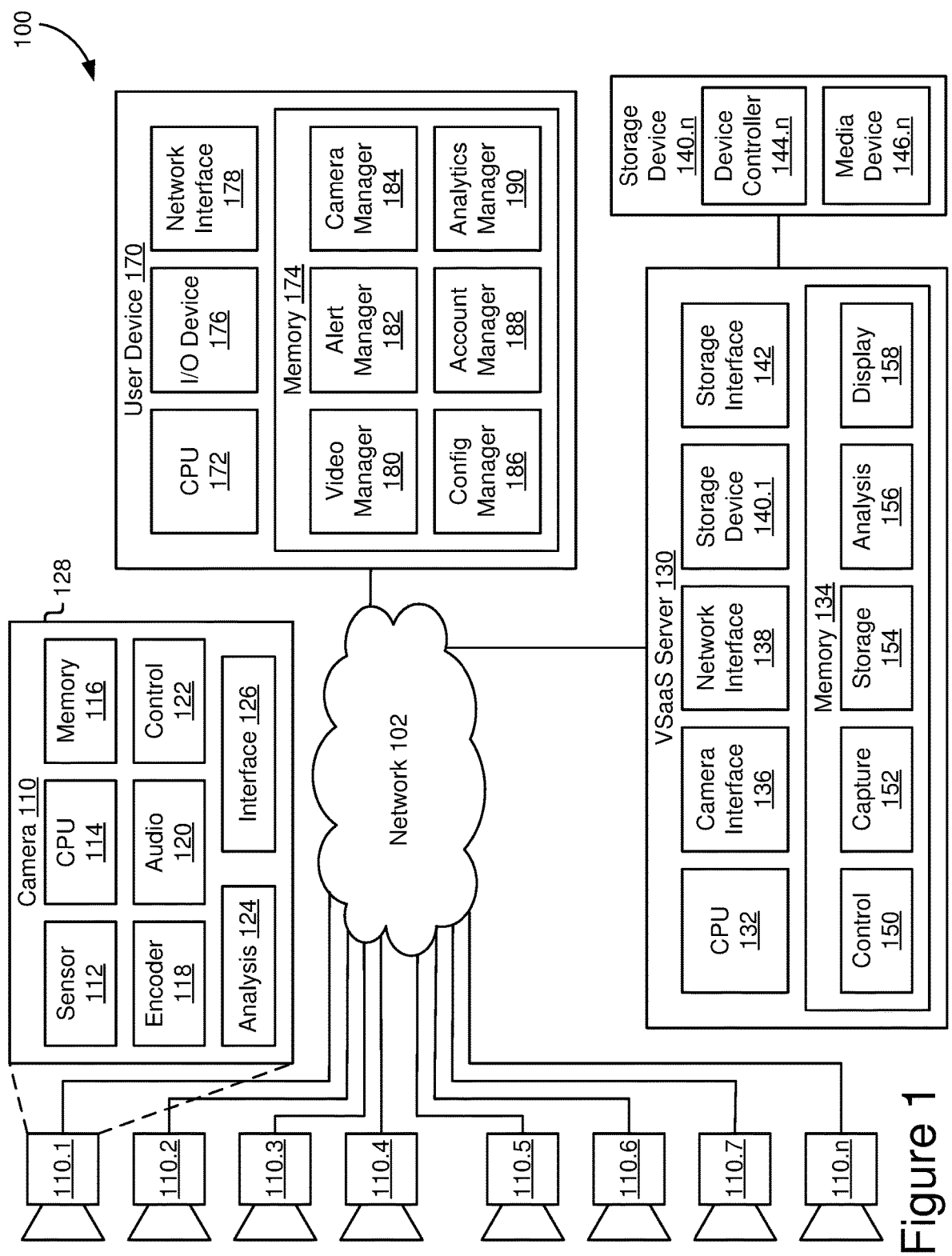
FIG. 1 schematically illustrates a computer-based surveillance system.

FIG. 1 shows an embodiment of an example video surveillance system 100 with multiple video cameras 110 interconnected to a video surveillance as a service (VSaaS) server 130 for display of surveillance video on user device 170. While some example features are illustrated, various other features have not been illustrated for the sake of brevity and so as not to obscure pertinent aspects of the example embodiments disclosed herein. In some embodiments, cameras 110, VSaas server 130, and user device 170 are computer-based components that may be interconnected by a network 102.

In some embodiments, one or more networks 102 may be used to communicatively interconnect various components of surveillance system 100. For example, each component, such as cameras 110, VSaas server 130, network storage device 140.n, and/or user device 170 may include one or more network interfaces and corresponding network protocols for communication over network 102. Network 102 may include a wired and/or wireless network (e.g., public and/or private computer networks in any number and/or configuration) which may be coupled in a suitable way for transferring data. For example, network 102 may include any means of a conventional data communication network such as a local area network (LAN), a wide area network (WAN), a telephone network, such as the public switched telephone network (PSTN), an intranet, the internet, or any other suitable communication network or combination of communication networks. In some embodiments, network 102 may comprise a plurality of distinct networks, subnetworks, and/or virtual private networks (VPN) may be used to limit communications among specific components. For example, cameras 110 may be on a limited access network such that video and control data may only be transmitted between cameras 110 and VSaas server 130, enabling VSaas server 130 to control access to cameras 110 and their video data.

Cameras 110 may include analog or digital cameras connected to an encoder that generates an encoded video stream of time-dependent video frames with a defined resolution, aspect ratio, and video encoding format. In some embodiments, cameras 110 may include internet protocol (IP) cameras configured to encode their respective video streams and stream them over network 102 to VSaaS server 130. In some embodiments, cameras 110 may be configured to receive audio data through integrated or connected microphones (not shown) and include embedded and/or synchronized audio streams with their respective video streams. In some embodiments, video cameras 110 may include an image sensor 112, a processor (central processing unit (CPU), a neural processing unit, a vision processing unit, etc.) 114, a memory 116, an encoder 118, an audio channel 120, a control circuit 122, and/or a network interface 126. In some embodiments, video cameras 110 may include onboard analytics, such as a video analysis subsystem 124.

In some embodiments, the components of camera 110 may be configured in one or more processing systems or subsystems and/or printed circuit boards, chips, busses, etc. that are disposed or enclosed in a video camera housing 128. For example, image sensor 112, processor 114, memory 116, encoder 118, audio channel 120, control circuit 122, analysis subsystem 124, and/or a network interface 126 may comprise one or more application-specific integrated circuits (ASICs) mounted within a sealed plastic, metal, or similar housing 128 with an aperture (often integrating a lens) for receiving light and one or more physical interconnects, such as a network port, for receiving power and communicatively coupling with other system components.

In some embodiments, image sensor 112 may include a solid state device configured to capture light waves and/or other electromagnetic waves and convert the light into video images, generally composed of colored pixels. Image sensor 112 may determine a base image size, resolution, bandwidth, depth of field, dynamic range, and other parameters of the video image frames captured. Image sensor 112 may include charged couple device (CCD), complementary metal oxide semiconductor (CMOS), and/or other image sensor devices of various sensor sizes and aspect ratios. In some embodiments, image sensor 112 may be paired with one or more filters, such as infrared (IR) blocking filters, for modifying the light received by image sensor 112 and/or processed by camera 110. For example, an IR blocking filter may be selectively enabled or disabled for different image capture use cases. In some embodiments, one or more video cameras 110 may include more than one image sensor and related video data paths. For example, video camera 110 may include two image sensors, associated lenses, and data paths to the encoding and processing components in video camera 110. In some embodiments, multiple image sensors are supported by the same circuit board and/or processing subsystem containing processor 114, memory 116, encoder 118, audio channel 120, control circuit 122, analysis subsystem 124, and/or network interface 126.

Digital video data from image sensor 112 may be received by processor 114 for storage and processing in memory 116 and/or encoding by encoder 118. Processor 114 may include any type of conventional processor or microprocessor that interprets and executes instructions. In some embodiments, processor 114 may include a neural network processor, such as a neural network processor used by analysis subsystem 124 for supporting object recognition or other onboard analysis. Memory 116 may include a random access memory (RAM) or another type of dynamic storage device that stores information and instructions for execution by processor 114 and/or a read only memory (ROM) or another type of static storage device that stores static information and instructions for use by processor 114 and/or any suitable storage element such as a solid state storage element. Memory 116 may store basic input/output system (BIOS), firmware, and/or operating system instructions for initializing and executing the instructions and processes of cameras 110.

In some embodiments, memory 116 may include one or more on-board and/or in-camera data storage devices, such as disk drives (solid-state drives, hard disk drives, hybrid drives, tape drives, etc.), universal serial bus (USB) flash drives, secure digital (SD) cards or SD extended capacity (SDXC) cards, and/or other form factors. For example, video cameras 110 may each include a storage interface and data storage device, such as an SD card, configured to store video data captured by image sensor 112 and encoded by encoder 118 without relying on VSaaS server 130, network storage devices 140.n, a network video recorder (not shown), and/or other components of surveillance system 100 for primary video storage. In some embodiments, video data may be stored in memory 116 of video cameras 110.1-110.n and selectively provided to VSaaS server 130 and/or user device 170 to support off-camera analytics, selective storage of high-value video data (detected events and/or selected for archiving), serving video data for user display on user device 1702, etc. For example, memory 116 may be used to record video data according to a video capture loop, where the data storage device has a capacity for storing hours, days, or weeks of video data before overwriting previously recorded video data in the data storage device, and VSaaS server 130 and/or a surveillance application on user device 170 may selectively access and/or replicate video data from the video cameras during the moving window of the loop cycle before it is erased (and replaced by more recent video data).

Encoder 118 may use various possible digital encoding and/or compression formats for encoding the video data generated by image sensor 112 into a time-dependent video stream composed of video frames at a determined frame rate (number of frames per second). In some embodiments, encoder 118 may use a compressed video format to reduce the storage size and network bandwidth necessary for storing and transferring the original video stream. For example, encoder 118 may be configured to encode the video data as joint photographic expert group (JPEG), motion picture expert group (MPEG)-2, MPEG-4, advanced video coding (AVC)/H.264, and/or other video encoding standards or proprietary formats. In some embodiments, the compressed video format may generate a compressed video data stream that uses variable compression to remove redundancies between video data frames. For example, use of variable compression may cause video captured during a fixed time window to occupy different sizes in memory (e.g. 2 megabytes (MB) of compressed video data versus 4 MB of compressed video data for a minute of recording using the same variable compression codec, depending on the compressibility of the video content captured during the one minute time window).

Camera 110 may include audio channel 120 configured to capture audio data to be processed and encoded with image data in the resulting video stream. In some embodiments, one or more microphones may be selectively enabled to capture audio data in parallel with the image data captured by image sensor 112. For example, microphone may be configured with an audio sensor that captures sound waves and converts them into a time-based audio data stream. In some embodiments, encoder 118 may include an audio encoder that operates in conjunction with the video encoder to encode a synchronized audio data stream in the video stream. For example, the video format used to by encoder 118 may include one or more audio tracks for encoding audio data to accompany the image data during video stream playback.

Control circuit 122 may include a control circuit for managing the physical position of a camera 110. In some embodiments, camera 110 may be a pan-tilt-zoom (PTZ) camera that is capable of remote directional and zoom control. Control circuit 122 may be configured to receive motion commands through network interface 126 and/or through another interface, such as a dedicated remote-control interface, such short distance infrared signals, Bluetooth, etc. For example, VSaaS server 130 and/or user device 170 may be configured to send PTZ commands to control circuit 122, which translates those commands into motor position control signals for a plurality of actuators that control the position of camera 110. In some embodiments, control circuit 122 may include logic for automatically responding to movement or other triggers detected through image sensor 112 to redirect camera 110 toward the source of movement or other trigger. For example, an auto tracking feature may be embodied in firmware that enables the camera to estimate the size and position of an object based on changes in the pixels in the raw video stream from image sensor 112 and adjust the position of the camera to follow the moving object, returning to a default position when movement is no longer detected. Similarly, an auto capture feature may be embodied in firmware that enables the camera to determine and bound an object based on an object detection algorithm and center and zoom on that object to improve image size and quality. In some embodiments, control circuit 122 may include logic for virtual PTZ or ePTZ, which enables a high-resolution camera to digitally zoom and pan to portions of the image collected by image sensor 112, with no physical movement of the camera. In some embodiments, control circuit 122 may include software and one or more application protocol interfaces (APIs) for enabling remote devices to control additional features and capabilities of camera 110. For example, control circuit 122 may enable VSaaS server 130, another video camera 110, and/or user device 170 to configure video formats, enable and disable filters, set motion detection, auto tracking, and similar features, and/or initiate video data streaming. In some embodiments, one or more systems may provide PTZ position control signals (and/or PTZ positioning commands converted to PTZ position control signals by control circuit 122) through the API.

In some embodiments, video camera 110 may include video analysis subsystem 124 configured for onboard video analytics. For example, video analysis subsystem 124 may be configured to use processor 114 and memory 116 to execute at least a portion of video analytics for video data captured by video camera 110. In some embodiments, video analysis subsystem 124 may be configured to operate similarly to video analysis subsystem 156 in VSaaS server 130, as further described below, and embody one or more analytics engines and/or analytical model libraries. In some embodiments, video analysis subsystem 124 may be configured to support real-time image classification and object detection within camera 110 without processing support from VSaaS server 130. For example, video analysis subsystem 124 may receive a video stream (from sensor 112 and/or encoder 118), classify the video frame to determine whether an object type of interest is present and, if so, initiate an object detector to determine the object's position within the video frame (and/or subsequent video frames).

Network interface 126 may include one or more wired or wireless connections to network 102 and/or a dedicated camera interface of network video recorder 130. For example, network interface 126 may include an ethernet jack and corresponding protocols for IP communication with VSaaS server 130 and/or a network video recorder (not shown). In some embodiments, network interface 126 may include a power over ethernet (PoE) connection with a camera access point or gateway. PoE may enable both power for camera 110 and network data to travel on the same wire. In some embodiments, network interface 126 may enable an IP camera to be configured as a network resource with an IP address that is accessible on a LAN, WAN, or the internet. For example, VSaaS server 130 and/or user device 170 may be configured to selectively receive video from cameras 110 from any internet-connected location using internet addressing and security protocols.

VSaaS server 130 may include a computer system configured as a video storage device or interface to a network video storage device to selectively receive the video streams from cameras 110. For example, VSaaS server 130 may be configured to receive video streams from each of cameras 110 for selective storage, analysis, and/or display through user device 170. In some embodiments, some or all of the functions of VSaaS server 130 may be embodied in a network video recorder collocated with some or all of cameras 110 and/or a proprietary network video server specifically configured to support cameras 110. In some embodiments, cameras 110 may send encoded video streams based on the raw image data collected from their respective image sensors 112, with or without video data compression. A single video stream may be received from each camera 110 and VSaaS server 130 may be configured to receive video streams from all connected cameras in parallel, as network bandwidth and processing resources allow.

VSaaS server 130 may include one or more server devices and/or associated network storage devices 140.n, where each server device includes at least one processor 132, at least one memory 134, at least one storage device 140, and at least one interface, such as camera interface 136, network interface 138, and/or storage interface 142. A plurality of VSaaS servers 130 may be configured for mounting within rack systems and maintained in a data center that is remote from cameras 110 and/or geographically distributed among a number of data centers in geographic locations for distributed, cloud-based surveillance services. Processor 132 may include any type of processor or microprocessor that interprets and executes instructions or operations. Memory 134 may include a random access memory (RAM) or another type of dynamic storage device that stores information and instructions for execution by processor 132 and/or a read only memory (ROM) or another type of static storage device that stores static information and instructions for use by processor 132 and/or any suitable storage element.

In some embodiments, VSaaS server 130 may interface with a local gateway or network video recorder that includes camera interface 136 configured for connection with one or more cameras 110. For example, camera interface 136 may include a plurality of ethernet ports and supporting protocols compatible with PoE standards for connecting to cameras 110.5-110.n. In some embodiments, camera interface 136 may include a PoE network switch for providing power to connected cameras and routing data packets to and from cameras 110.5-110.n, such as control and video data. In some embodiments, VSaaS server 130 may not include a camera interface 136 and may use network interface 138 for communication with cameras 110 over network 102.

Network interface 138 may include one or more wired or wireless network connections to network 102. Network interface 138 may include a physical interface, such as an ethernet port, and related hardware and software protocols for communication over network 102, such as a network interface card.

Storage devices 140 may include one or more non-volatile memory devices configured to store video data, such as a hard disk drive (HDD), solid state drive (SSD), flash memory-based removable storage (e.g., secure data (SD) card), embedded memory chips, etc. In some embodiments, storage device 140 is, or includes, a plurality of solid-state drives. In some embodiments, VSaaS server 130 may include internal storage device 140.1 and expandable storage or access to network storage that enables additional storage devices 140.n to be connected via storage interface 142. Each storage device 140 may include a non-volatile memory (NVM) or device controller 144 based on compute resources (processor and memory) and a plurality of NVM or media devices 146 for data storage (e.g., one or more NVM device(s), such as one or more flash memory devices). In some embodiments, a respective data storage device 140 of the one or more data storage devices includes one or more NVM controllers, such as flash controllers or channel controllers (e.g., for storage devices having NVM devices in multiple memory channels). In some embodiments, storage devices 140 may each be packaged in a housing, such as a multi-part sealed housing with a defined form factor and ports and/or connectors for interconnecting with storage interface 142. Storage device 140.1 and each expanded storage devices 140.n may be of the same storage device type or a different storage device type. In some embodiments, data storage devices used for video data storage in cameras 110 may be configured similarly to storage devices 140.n.

In some embodiments, a respective data storage device 140 may include a single medium device, while in other embodiments the respective data storage device 140 includes a plurality of media devices. In some embodiments, media devices include NAND-type flash memory or NOR-type flash memory. In some embodiments, storage device 140 may include one or more hard disk drives. In some embodiments, storage devices 140 may include a flash memory device, which in turn includes one or more flash memory die, one or more flash memory packages, one or more flash memory channels or the like. However, in some embodiments, one or more of the data storage devices 140 may have other types of non-volatile data storage media (e.g., phase-change random access memory (PCRAM), resistive random access memory (ReRAM), spin-transfer torque random access memory (STT-RAM), magneto-resistive random access memory (MRAM), etc.).

In some embodiments, each storage device 140 includes a device controller 144, which includes one or more processing units (also sometimes called CPUs or processors or microprocessors or microcontrollers) configured to execute instructions in one or more programs. In some embodiments, the one or more processors are shared by one or more components within, and in some cases, beyond the function of the device controllers. Media devices 146 are coupled to device controllers 144 through connections that typically convey commands in addition to data, and optionally convey metadata, error correction information and/or other information in addition to data values to be stored in media devices and data values read from media devices 146. Media devices 146 may include any number (i.e., one or more) of memory devices including, without limitation, non-volatile semiconductor memory devices, such as flash memory device(s). In some embodiments, media devices 146 may include NAND or NOR flash memory devices comprised of single level cells (SLC), multiple level cell (MLC), triple-level cells, or more.

In some embodiments, media devices 146 in storage devices 140 are divided into a number of addressable and individually selectable blocks, sometimes called erase blocks. In some embodiments, individually selectable blocks are the minimum size erasable units in a flash memory device. In other words, each block contains the minimum number of memory cells that can be erased simultaneously (i.e., in a single erase operation). Each block is usually further divided into a plurality of pages and/or word lines, where each page or word line is typically an instance of the smallest individually accessible (readable) portion in a block. In some embodiments (e.g., using some types of flash memory), the smallest individually accessible unit of a data set, however, is a sector or codeword, which is a subunit of a page. That is, a block includes a plurality of pages, each page contains a plurality of sectors or codewords, and each sector or codeword is the minimum unit of data for reading data from the flash memory device.

A data unit may describe any size allocation of data, such as host block, data object, sector, page, multi-plane page, erase/programming block, media device/package, etc. Storage locations may include physical and/or logical locations on storage devices 140 and may be described and/or allocated at different levels of granularity depending on the storage medium, storage device/system configuration, and/or context. For example, storage locations may be allocated at a host logical block address (LBA) data unit size and addressability for host read/write purposes but managed as pages with storage device addressing managed in the media flash translation layer (FTL) in other contexts. Media segments may include physical storage locations on storage devices 140, which may also correspond to one or more logical storage locations. In some embodiments, media segments may include a continuous series of physical storage location, such as adjacent data units on a storage medium, and, for flash memory devices, may correspond to one or more media erase or programming blocks. A logical data group may include a plurality of logical data units that may be grouped on a logical basis, regardless of storage location, such as data objects, video media files, or other logical data constructs composed of multiple host blocks. In some embodiments, storage device 140 may be configured specifically for managing the storage and overwriting of video data in a continual monitoring application for video surveillance.

Storage interface 142 may include a physical interface for connecting to one or more external storage devices using an interface protocol that supports storage device access. For example, storage interface 142 may include a peripheral component interconnect express (PCIe), serial advanced technology attachment (SATA), small computer system interface (SCSI), serial attached SCSI (SAS), universal serial bus (USB), Firewire, or similar storage interface connector supporting storage protocol access to storage devices 140.n. In some embodiments, storage interface 142 may include a wireless data connection with sufficient bandwidth for video data transfer. Depending on the configuration and protocols used by storage interface 142, storage device 140.n may include a corresponding interface adapter, firmware, and/or protocols for receiving, managing, and responding to storage commands from VSaaS server 130.

VSaaS server 130 may include a plurality of modules or subsystems that are stored and/or instantiated in memory 134 for execution by processor 132 as instructions or operations. For example, memory 134 may include a camera control subsystem 150 configured to control cameras 110. Memory 134 may include a video capture subsystem 152 configured to receive video streams from cameras 110. Memory 134 may include a video storage subsystem 154 configured to store received video data in storage device(s) 140 and/or network video storage 162. Memory 134 may include a video analysis subsystem configured to analyze video streams and/or video data for defined events, such as motion, recognized objects, recognized faces, and combinations thereof. Memory 134 may include a video display subsystem configured to selectively display video streams on user device 170, which may be attached to VSaaS server 130 or remotely connected via network 102.

In some embodiments, camera control subsystem 150 may include interface protocols and a set of functions and parameters for using, configuring, communicating with, and providing command messages to cameras 110. For example, camera control subsystem 150 may include an API and command set for interacting with control circuit 122 to access one or more camera functions. In some embodiments, camera control subsystem 150 may be configured to set video configuration parameters for image sensor 112 and/or video encoder 118, access pan-tilt-zoom features of control circuit 122, set or modify camera-based motion detection, tripwire, and/or low light detection parameters in memory 116, and/or otherwise manage operation of cameras 110. For example, camera control subsystem 150 may maintain a video camera configuration table, pages, or similar data structures that includes entries for each video camera being managed and their respective camera-specific configuration parameters, active control features (such as PTZ control), and other configuration and control information for managing cameras 110. In some embodiments, each camera 110 may be assigned a unique camera identifier that may be used by camera control subsystem 150, video capture subsystem 152, and/or other subsystems to associate video data with the camera from which it was received.

In some embodiments, video capture subsystem 152 may include interface protocols and a set of functions and parameters for receiving video streams from cameras 110. For example, video capture subsystem 152 may include video data channels and related data buffers for managing a plurality of camera video data streams. In some embodiments, each video camera 110 may be allocated a dedicated video channel for continuously and/or selectively sending its video stream to VSaaS server 130. Video capture subsystem 152 may be configured to pass each received video stream and/or selected video portions thereof to video storage subsystem 154, video analysis subsystem 156, and/or video display subsystem 158. For example, received video streams may be buffered by video capture subsystem 152 before being streamed to video storage subsystem 154 and split into dual video streams with different video parameters for video analysis subsystem 156 and video display subsystem 158.

In some embodiments, video storage subsystem 154 may include interface protocols and a set of functions and parameters for managing storage of video data in storage devices 140 and/or other network video storage for later retrieval and use by video analysis subsystem 156 and/or video display subsystem 158. For example, video storage subsystem 154 may write camera video stream data from video data buffers to non-volatile storage in storage devices 140 and video analysis subsystem 156 and/or video display subsystem 158 may be configured to selectively read video data from storage devices 140. In some embodiments, video storage subsystem 154 may include management of video storage space in storage devices 140 and/or network video storage 162 in accordance with one or more data retention and/or data archiving schemes. For example, surveillance system 100 may support continuous and/or triggered recording of video data from cameras 110 and video storage subsystem 154 may include logic for enforcing a data retention and overwriting policy whereby the fixed storage space of storage devices 140 is recycled for storing a recent period of captured video, video data meeting specific retention criteria, and/or deleting or archiving video data after one or more periods of time defined in the data retention policy. In some embodiments, video storage subsystem 154 may include or access video decoders and/or encoders for storing video data in a storage video format that is different than the camera video format, such as using a different codec, compression factor, frame rate, resolution, image size, etc.

In some embodiments, video storage subsystem 154 may be configured to rely on in-camera storage (e.g., memory 116 and/or data storage devices therein) for primary storage of the captured video streams and selectively archive video data of particular interest, such as video data portions flagged by in-camera analysis subsystem 124 and/or analysis subsystem 156 as containing particular objects, events, or other parameters. In some embodiments, cameras 110 may be configured to send parity data, backup video data, and/or parity management logs to VSaaS server 130 for storage through video storage subsystem 154. This selectively offloaded data from cameras 110 may support parity-based redundant storage among a group of video cameras. In some embodiments, video storage subsystem 154 may also include logic for recovering video data in the event of a storage failure by one or more of cameras 110. For example, video storage subsystem 154 may access parity management logs to determine the location of source video data blocks and corresponding parity blocks needed to recover the source video data of the lost camera, as well as initiate and oversee the data recovery process to storage device 140.$n$ and/or to a replacement camera 110 or storage device therein (such as a replacement SD card).

In some embodiments, video analysis subsystem 156 may include interface protocols and a set of functions and parameters for analyzing video data from cameras 110. For example, video analysis subsystem 156 may be configured to run one or more event detection algorithms for determining, tagging, and/or initiating alerts or other actions in response to detected video events. In some embodiments, video analysis subsystem 156 may be configured to tag or build metadata structures that map detected events to time and image location markers for the video stream from which they are detected. For example, video analysis subsystem 156 may use motion, tripwire, object recognition, facial recognition, audio detection, speech recognition, and/or other algorithms to determine events occurring in a video stream and tag them in a corresponding metadata track and/or separate metadata table associated with the video data object. In some embodiments, video analysis subsystem 156 may include event handling logic for determining response to detection of one or more detected events, such as raising an alert to user device 170 or triggering selective display of a video stream including the detected event through video display subsystem 158. In some embodiments, video analysis subsystem 156 may operate in real-time or near real-time on video data received by video capture subsystem 152, delayed processing of video data stored by video storage subsystem 154, and/or a combination thereof based on the nature (and processing requirements) of the video events, volume of video to be processed, and other factors. In some embodiments, video analysis subsystem 156 may comprise one or more analytics engines configured for a particular type of event and corresponding event detection algorithm or model.

In some embodiments, video display subsystem 158 may include interface protocols and a set of functions and parameters for displaying video from video capture subsystem 152 and/or video storage subsystem 154 on user device 170. For example, video display subsystem 158 may include a monitoring or display configuration for displaying one or more video streams in real-time or near real-time on a graphical user display of user device 170 and/or receive video navigation commands from user device 170 to selectively display stored video data from video storage subsystem 154. In some embodiments, video display subsystem 158 may maintain an index of real-time/near real-time video streams and/or stored or archived video streams that are available for access by user device 170. In some embodiments, the video index may include a corresponding metadata index that includes video data parameters (e.g., time, location, camera identifier, format, low light/normal light, etc.), detected video event metadata (event time, location, type, parameters, etc.), and/or video management parameters (expiration, active/archive, access control, etc.) for use in displaying and managing video data. Video display subsystem 158 may be configured to support user device 170 when directly attached to a network video recorder and/or via network 102 within a LAN, WAN, VPN, or the internet.

User device 170 may be any suitable computer device, such as a computer, a computer server, a laptop computer, a tablet device, a netbook, an internet kiosk, a personal digital assistant, a mobile phone, a smart phone, a gaming device, or any other computing device. User device 170 is sometimes called a host, client, or client system. In some embodiments, user device 170 may host or instantiate one or more applications for interfacing with surveillance system 100. For example, user device 170 may be a personal computer or mobile device running a surveillance monitoring and management application configured to provide a user interface for VSaaS server 130. In some embodiments, user device 170 may be configured to access cameras 110 and/or their respective video streams through VSaaS server 130 and/or directly through network 102. In some embodiments, one or more functions of VSaaS server 130 may be instantiated in user device 170 and/or one or more functions of user device 170 may be instantiated in VSaaS server 130 and/or a network video recorder (not shown).

User device 170 may include one or more processors 172 for executing compute operations or instructions stored in memory 174 for accessing video data and other functions of VSaaS server 130 through network 102. In some embodiments, processor 172 may be associated with memory 174 and input/output device 176 for executing both video display operations and surveillance system management operations. Processor 172 may include any type of processor or microprocessor that interprets and executes instructions or operations. Memory 174 may include a random access memory (RAM) or another type of dynamic storage device that stores information and instructions for execution by processor 172 and/or a read only memory (ROM) or another type of static storage device that stores static information and instructions for use by processor 172 and/or any suitable storage element. In some embodiments, user device 170 may allocate a portion of memory 174 and/or another local storage device (in or attached to user device 170) for storing selected video data for user device 170. In some embodiments, user device 170 may include one or more input/output (I/O) devices 176. For example, a graphical display, such as a monitor and/or touch screen display, and/or other user interface components such as a keyboard, a mouse, function buttons, speakers, vibration motor, a track-pad, a pen, voice recognition, biometric mechanisms, and/or any number of supplemental devices to add functionality to user device 170. Network interface 178 may include one or more wired or wireless network connections to network 102. Network interface 178 may include a physical interface, such as an ethernet port, and/or related hardware and software protocols for communication over network 102, such as a network interface card, wireless network adapter, and/or cellular data interface.

User device 170 may include a plurality of modules or subsystems that are stored and/or instantiated in memory 174 for execution by processor 172 as instructions or operations. For example, memory 174 may include a video manager 180 configured to provide a user interface for selectively navigating and displaying real-time, near real-time, and/or stored video streams. Memory 174 may include alert manager 182 configured to provide a user interface for setting, monitoring, and displaying alerts based on video events. Memory 174 may include a camera manager 184 configured to provide a user interface for identifying, configuring, and managing cameras 110. Memory 174 may include a configuration manager 186 to provide a user interface for setting and managing system settings, user access controls, storage options, and other configuration settings for surveillance system 100. Memory 174 may include an account manager 188 configured to provide a user interface for identifying, configuring, and managing a secure user account for VSaaS server 130. Memory 174 may include an analytics manager configured to provide a user interface for selecting, training, and managing event detection algorithms for surveillance system 100.

In some embodiments, video manager 180 may include interface protocols and a set of functions and parameters for navigating and displaying video streams from cameras 110. For example, video manager 180 may include a graphical user interface and interactive controls for displaying lists, tables, thumbnails, or similar interface elements for selecting and displaying video streams for particular cameras, times, locations, and/or events. In some embodiments, video manager 180 may enable split screen display of multiple camera video streams. For example, the near real-time video streams (with a predetermined lag based on network lag, storage, and processing times) from all active cameras may be displayed on a monitoring interface or a set of video streams corresponding to a detected event may be displayed in an event review interface. In some embodiments, video manager 180 may include a data structure summarizing all video data stored in surveillance system 100 to enable the user to locate and view older surveillance video. For example, a video management log or database may include entries for stored video data indexed by related metadata, such as video data parameters (e.g., time, location, camera identifier, format, low light/normal light, etc.), detected video event metadata (event time, location, type, parameters, etc.), and/or video management parameters (expiration, active/archive, access control, etc.). In some embodiments, video manager 180 may be configured to interface with video display subsystem 158 and/or storage subsystem 154 for determining and retrieving selected video data.

In some embodiments, alert manager 182 may include interface protocols and a set of functions and parameters for setting, monitoring, and displaying alerts based on video events. For example, the user may define a set of trigger events that generate visual, audible, tactile, and/or notification-based (electronic mail, text message, automated call, etc.) alert to user device 170. In some embodiments, alert manager 182 may include a plurality of preset alert conditions with associated event parameters and allow a user to enable and disable alert types and/or change associated event parameters. In some embodiments, alert manager 182 may be configured to overlay graphical elements representing detected events or event indicators on video streams displayed through video manager 180. For example, detected motion, objects, or faces may be boxed or highlighted, tagged with relevant identifiers, or otherwise indicated in the video playback on user device 170. In some embodiments, alert manager 182 may be configured to interface with video analysis subsystem 156, video capture subsystem 152, and/or directly with cameras 110 for receiving event notifications or parameters.

In some embodiments, camera manager 184 may include interface protocols and a set of functions and parameters for identifying, configuring, and managing cameras 110. Configuration manager 186 may include interface protocols and a set of functions and parameters for setting and managing system settings, user access controls, storage options, and other configuration settings. Account manager 188 may include interface protocols and a set of functions and parameters for identifying, configuring, and managing access to VSaaS server 130. For example, each of camera manager 184, configuration manager 186, and/or account manager 188 may include a series of graphical user interfaces for displaying their respective component identifiers and related configuration parameters and enabling the user to view and/or change those parameters for managing surveillance system 100 and its component systems. In some embodiments, camera manager 184, configuration manager 186, and/or account manager 188 may provide changes parameters to the effected components, such as camera manager 184 sending camera configuration parameter changes to selected cameras 110, account manager 188 sending VSaaS account configuration parameter changes to VSaaS server 130, and/or configuration manager 186 sending system configuration parameter changes to all effected components.

In some embodiments, analytics manager 190 may include interface protocols and a set of functions and parameters for selecting, training, and managing event detection algorithms. For example, analytics manager 190 may include a library of event detection algorithms for different event types. In some embodiments, the event detection algorithms may include a set of parameters and/or model weights that are preconfigured based on training data sets processed independent of surveillance system 100. For example, analytics manager 190 may include object detection algorithms for common objects, situations, and camera configurations. In some embodiments, analytics manager 190 may include preconfigured training data sets and/or allow the user to define training data sets for determining or refining event detection algorithm parameters and/or model weights based on predefined base algorithms or models. In some embodiments, analytics manager 190 may interface with analysis subsystem 156 for using the event detection algorithms configured through analytics manager 190 to process video data captured by cameras 110 and/or selecting, training, and managing those algorithms.

Figure 2A:
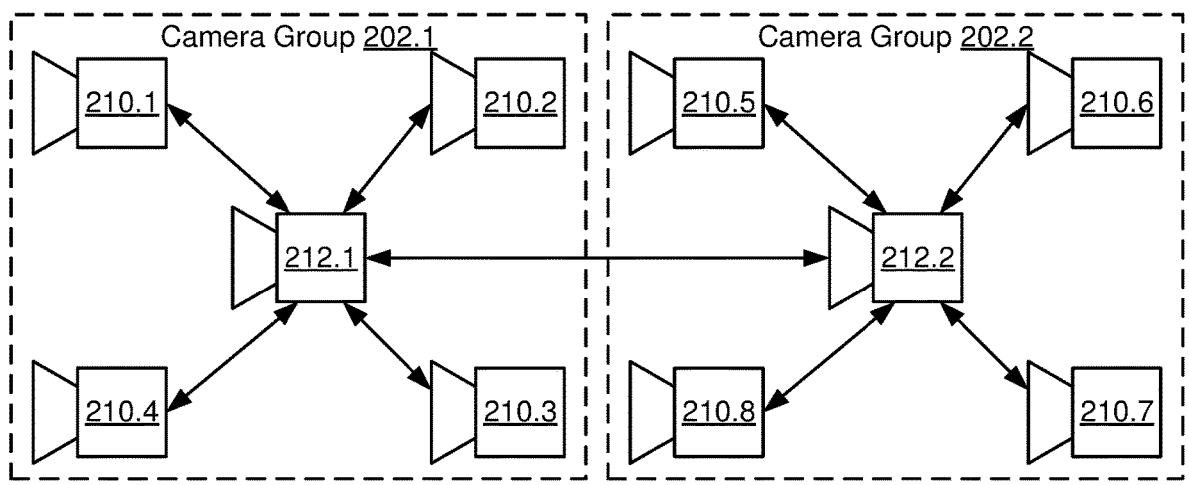
FIG. 2a schematically illustrates an example camera group topology that may be used for redundant video data storage, such as by the computer-based surveillance system of FIG. 1.
Figure 2B:
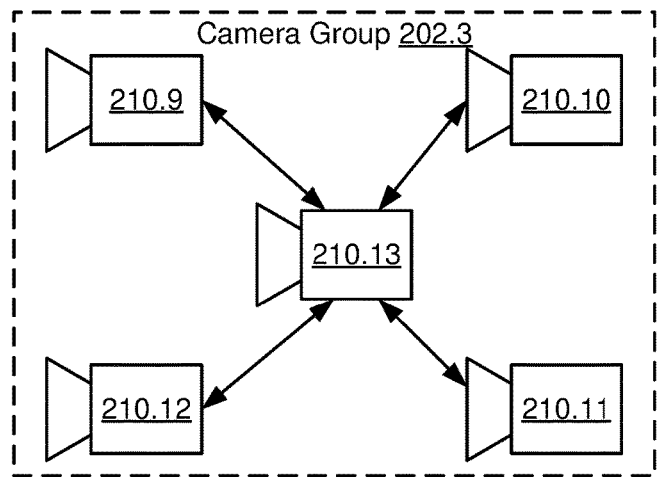
FIG. 2b schematically illustrates another example camera group topology that may be used for redundant video data storage, such as by the computer-based surveillance system of FIG. 1.
Figure 2C:
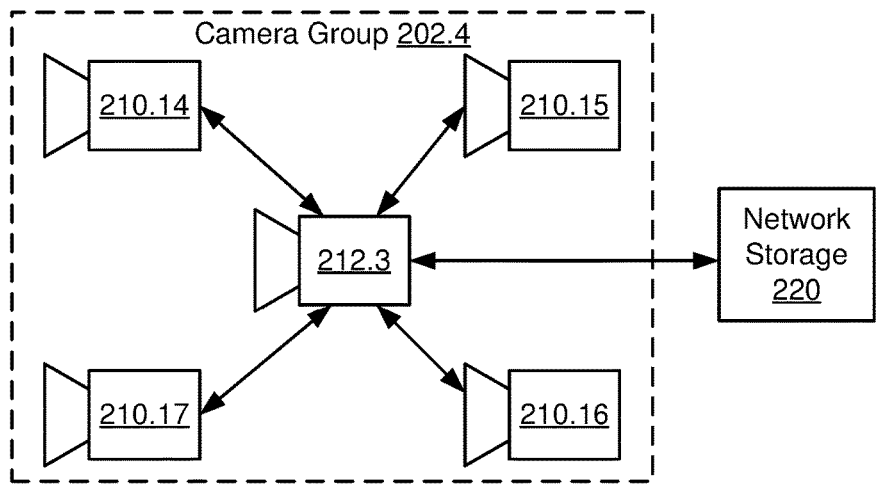
FIG. 2c schematically illustrates an example camera group topology that may be used for redundant video data storage, such as by the computer-based surveillance system of FIG. 1.

FIGS. 2a, 2b, and 2c show schematic representations of example camera group topologies that may be used for redundant video data storage in a computer-based surveillance system 200, such as surveillance system 100 in FIG. 1. Each example topology is shown based on camera groups including five cameras, but any number of peer video cameras and one or more parity cameras may be used for each topology. In some embodiments, the topology may be based on a plurality of video cameras 210, 212 configured similarly to cameras 110 in FIG. 1. In some embodiments, a majority of the video cameras 210 in the topology may have a standard configuration with a first set of compute resources, including processor, memory, and/or data storage device configurations and one or more specially configured video cameras 212 with a second set of compute resources for increased capabilities. For example, the specially configured video cameras 212 may include more powerful processors, storage devices with greater storage capacity (e.g., double capacity) and/or input/output processing, and/or specialized processors or processing subsystems, such as a hardware parity engine. In some embodiments, one or more video cameras may be designated as parity video cameras due to their role in calculating parity data for the camera group. In some configurations, parity video cameras may be specially configured video cameras 212 and, in some configurations, parity video cameras may be standard video cameras 210 that have been designated as parity video cameras for acting as the group leader and coordinating parity calculation and storage of parity data, backup video data, and/or parity management logs. In some embodiments, the parity video camera and/or group leader role may rotate among video cameras 210 to distribute the workload and/or storage demands on the designated parity video camera.

In FIG. 2a, a first video camera group 202.1 and a second camera group 202.2 may be configured to move parity data and/or backup data between their respective parity cameras 212.1 and 212.2 in order to assure that failure of one of the parity cameras does not result in data loss for its group. For example, parity camera 212.1 may be configured to receive video data from each peer video camera 210.1, 210.2, 210.3, and 210.4 and calculate a parity data set that would enable recovery of the video data from any of those cameras, should they fail. However, if parity camera 212.1 stored both the parity data and the only copy of its own source video data (the video data that the parity camera captured itself), loss or failure of parity camera 212.1 would result in the loss of its data. To avoid this, parity camera 212.1 may be configured to backup data to parity camera 212.2 in camera group 202.2. For example, parity camera 212.1 and parity camera 212.2 may exchange a set of backup data to assure that failure of on of the parity cameras does not result in data loss. In some embodiments, parity camera 212.1 may send a copy of its source video data to parity camera 212.2 and parity camera 212.2 may do the same. In some embodiments, to avoid needing additional storage for the backup data, the receiving parity camera may integrate the source video data from the other parity camera into its parity calculation as if it was just another peer video camera. As a result, the parity camera from the other camera group is protected by the parity data of the other camera group. If parity camera 212.1 fails, its video data may be recovered from the parity data in parity camera 212.2 and peer video data in peer video cameras 210.5, 210.6, 210.7, and 210.8 in camera group 202.2. Parity camera 212.2 may be protected by camera group 202.1 in a similar way. In another configuration, parity cameras 212.1 and 212.2 may have sufficiently large data storage capacities to store the backup video data from the other parity camera without parity calculation (i.e., simply mirroring the video data between the two video cameras). While this requires more data storage in the parity cameras, it simplifies the cross-group backups as timing of parity blocks does not have to be coordinated between the two groups. A similar configuration may be implemented where the parity camera sends the parity data rather than backup video data for its own source video data, simplifying the cross-group backups. While two groups are shown, similar configurations could be implemented for any number of groups (greater than 1), where the parity camera for each group sends its data to the parity camera of another group, such as in pairs (as shown for groups 202.1 and 202.2), circular backup relationships (e.g, a-to-b, b-to-c, c-to-a), or another configuration that assures that each parity camera is backed up outside of its group.

In FIG. 2b, camera group 202.3 may be configured to distribute parity and backup data by multiplexing it among the five cameras 210.9, 210.10, 210.11, 210.12, 210.13. In some embodiments, all five video cameras may have similar configurations, including storage capacity, and share in distributed storage of parity data and backup data for the video camera storing that portion of parity data. One video camera, such as video camera 210.13 in the example shown, may be designated as the parity camera and be configured to receive video data from the peer video cameras, calculate the parity data, and distribute the parity data and the backup data. In some embodiments, multiplexing the parity data and backup data may occur through time division multiplexing, where video data blocks for a time window are received and processed by the parity camera, the parity data is sent to a target parity storage camera and the source video data from the target parity storage camera is sent to a target backup storage camera. For each time window and corresponding set of video data blocks, parity data, and backup data, the target parity storage camera and the target backup storage camera change. For example, the target cameras may rotate among the five cameras round-robin or using another distribution algorithm. Note that the parity camera itself may also be among the cameras selected for parity storage and backup storage. This multiplexed configuration may have the advantage of allowing all cameras to have similar physical storage configurations, with the parity camera designated by camera group deployment configuration and software/firmware. The amount of storage capacity needed above the amount for the recording loop of each camera may be recording loop size plus the parity size, divided by the number of video cameras in the group. Operation of the multiplexed configuration may be further explained below with regard to FIGS. 5a-5c.

In FIG. 2c, camera group 202.4 may be configured to use network storage 220 for parity and/or backup storage. For example, camera group 202.4 may include parity video camera 212.3 and peer video cameras 210.14, 210.15, 210.16, and 210.17 configured similarly to camera group 202.1 in FIG. 2a. Rather than sending backup data, parity data and/or source video data for parity camera 212.3 to another camera group, parity camera 212.3 sends the backup data over a network connection to network storage 220. For example, network storage 220 may be network video storage available through a VSaaS server, as described above for FIG. 1, a local network video recorder or server, or another backup storage device, such as a network attached storage device. Selectively offloading the parity data and/or backup of the source video data for parity camera 212.3 may reduce both complexity and the amount of storage needed by the video cameras, but with additional bandwidth, connectivity, and reliability risks for reliably communicating with network storage 220.

Figure 3:
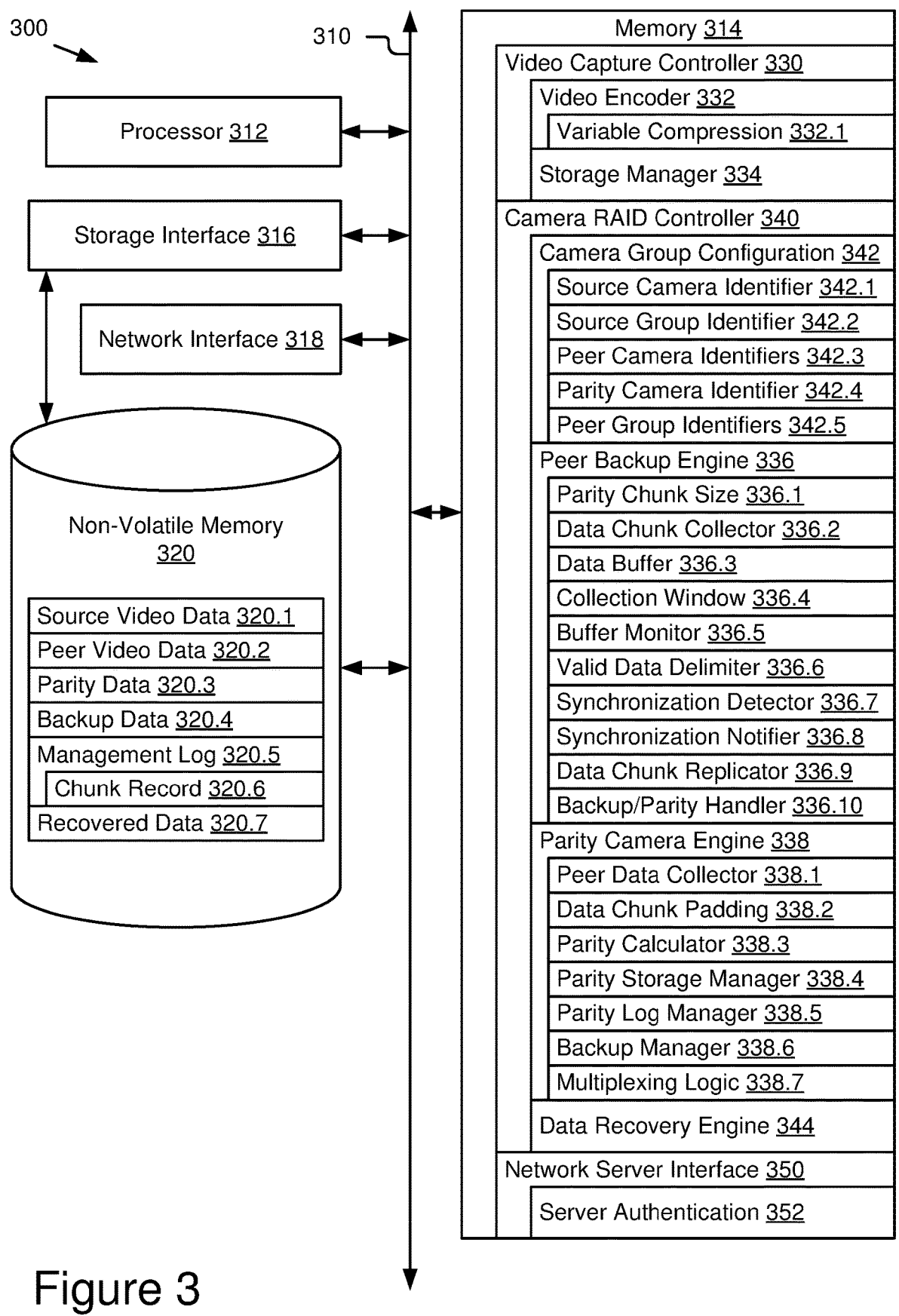
FIG. 3 schematically illustrates some elements of the computer-based surveillance system of FIG. 1.

FIG. 3 schematically shows selected modules of a surveillance system 300 configured for using in camera data storage for maintaining the video data in a redundancy scheme that prevents data loss from video camera loss or failure. Surveillance system 300 may incorporate elements and configurations similar to those shown in FIGS. 1-2. For example, surveillance system 300 may be configured in a plurality of video cameras similar to video cameras 110, 210, and 212. In some embodiments, one or more of the selected modules may access or be instantiated in the processors, memories, and other resources of video cameras configured for video capture, similar to video cameras 110. For example, a video camera and its embedded or attached data storage device may be configured with some or all functions of video capture controller 330, camera redundant array of independent disks (RAID) controller 340, and/or network server interface 350 to provide redundant video data storage in a distributed fashion at the edge of surveillance system 300 before selectively providing the video stream and generated metadata to other system components, such as a VSaaS server or user device, for additional analytics, storage, and/or use in a surveillance application. In some embodiments, each video camera in a group may be configured with video capture controller 330 and peer modules of camera RAID controller 340, such as peer backup engine 336, and the group leader or parity video camera may additionally include camera group configuration 342, parity camera engine 338, and data recovery engine 344.

Surveillance system 300 may include a bus 310 interconnecting at least one processor 312, at least one memory 314, and at least one interface, such as storage interface 316 and network interface 318. Bus 310 may include one or more conductors that permit communication among the components of surveillance system 300. Processor 312 may include any type of processor or microprocessor that interprets and executes instructions or operations. Memory 314 may include a random access memory (RAM) or another type of dynamic storage device that stores information and instructions for execution by processor 312 and/or a read only memory (ROM) or another type of static storage device that stores static information and instructions for use by processor 312 and/or any suitable storage element such as a hard disk or a solid state storage element. In some embodiments, processor 312 and memory 314 may be compute resources available for execution of logic or software instructions stored in memory 314 and computation intensive tasks may be configured to monitor and share these resources.

Storage interface 316 may be configured to provide a data storage device for storing video data in each video camera. Storage interface 316 may include a physical interface for connecting to one or more internal and/or removable storage devices using an interface protocol that supports storage device access. For example, storage interface 316 may include a PCIe, SATA, SCSI, SAS, USB, Firewire, SD, extended secure digital (XSD), or similar storage interface connector supporting storage protocol access to some or all of non-volatile memory 320. Depending on the configuration and protocols used by storage interface 316, non-volatile memory 320 may include a corresponding interface adapter, firmware, and/or protocols for receiving, managing, and responding to storage commands from the video camera. In some embodiments, non-volatile memory 320 may include a removable data storage device, such as an SD card, and storage interface 316 may include hardware (slot and conductor configuration) and software for storing to and reading from the removable data storage device.

Network interface 318 may include one or more wired or wireless network connections to network, similar to network 102. Network interface 318 may include a physical interface, such as an ethernet port, and related hardware and software protocols for communication over the network, such as a network interface card or wireless adapter.

Surveillance system 300 may include one or more non-volatile memory devices 320 configured to store video data. For example, non-volatile memory devices 320 may include a plurality of flash memory packages organized as an addressable memory array and/or one or more solid state drives or hard disk drives. In some embodiments, non-volatile memory devices 320 may include a plurality of storage devices within or attached to the video cameras for storing and accessing video data.

Surveillance system 300 may include a plurality of modules or subsystems that are stored and/or instantiated in memory 314 for execution by processor 312 as instructions or operations. For example, memory 314 may include a video capture controller 330 configured to enable each video camera to capture and store video streams for that camera. Memory 314 may include a camera RAID controller 340 configured to manage redundant storage of video data across a video camera group and/or recovery of video data in the event of loss or failure of camera video storage. Memory 314 may include a network server interface configured to provide a network interface for accessing and managing video data on the video cameras from a VSaaS server, video surveillance application, or other access point for a group of smart video cameras.

Video capture controller 330 may include interface protocols, functions, parameters, and data structures for capturing and storing video data within each video camera. For example, video capture controller 330 may be an embedded firmware application and corresponding hardware in a video camera configured to store video data for selective access through a VSaaS server and/or video surveillance application. Video capture controller 330 may be configured as an interface between video data captured through the camera's video image sensor and in camera storage, such as non-volatile memory 320, for the encoded video stream.

Video capture controller 330 may include image sensor interface protocols and a set of functions, parameters, and data structures for receiving video streams from the video image sensors. For example, video capture controller 330 may include video data channels and related data buffers for managing at least one video data stream. In some embodiments, video capture controller 330 may include a plurality of hardware and/or software modules configured to use processor 312 and memory 314 to handle or manage defined operations of video capture controller 330. For example, video capture controller 330 may include a video encoder 332 and a storage manager 334.

In some embodiments, video capture controller 330 may include one or more video encoders 332 configured to encode video data, such as raw video data from the image sensor, in a desired video format. For example, video encoder 332 may receive raw video frames in accordance with a defined frame rate and resolution to generate a time-dependent video stream that may be further processed according to a selected video codec and corresponding compression scheme. In some embodiments, video encoder 332 may be configured to generate video data for a defined resolution, image size, frame rate, codec, compression factor, color/gray-scale, or other video format parameters. In some embodiments, video encoder 332 may support one or more codecs for video encoding that support variable compression. As a result, each camera in a group of cameras may generate video data at different data sizes for the same recording window.

Storage manager 334 may include storage interface protocols and a set of functions, parameters, and data structures for managing storage of video data in non-volatile memory 320, for later retrieval and use by the camera's onboard analytics and/or access, display, and/or transfer to other systems through network server interface 350. For example, storage manager 334 may write camera video stream data from video data buffers and/or storage path video data from video encoder 332 to non-volatile memory 320 as source video data 320.1. In some embodiments, storage manager 334 may support peer backup engine 336 to allow video data from non-volatile memory 320 to be sent to a parity camera. For example, storage manager 334 may read video data from non-volatile memory 320 and/or video data buffers in video capture controller 330 to be sent to other cameras as peer video data. In some embodiments, storage manager 334 may also support peer backup engine 336 and/or parity camera engine 338 for storing distributed parity data and/or backup data from other cameras in non-volatile memory 320. For example, a parity camera or peer cameras in a multiplexing configuration may use storage manager 334 to store peer video data 320.2 from other cameras, parity data 320.3 calculated by the parity camera, backup data 320.4 (peer video data to backup the camera storing parity data), and/or parity management log data 320.5. In some embodiments, storage manager 334 may be configured to support data recovery engine 344 and store recovered data 320.7 in non-volatile memory 320.

In some embodiments, storage manager 334 may be configured to manage video storage space in non-volatile memory 320 in accordance with one or more data retention and/or data archiving schemes. For example, surveillance system 300 may support continuous and/or triggered recording of video data from associated cameras and storage manager 334 may include logic for enforcing a data retention and overwriting policy whereby the fixed storage space of non-volatile memory 320 is recycled for storing a recent period of captured video, video data meeting specific retention criteria, and/or deleting or archiving video data after one or more periods of time defined in the data retention policy. In some embodiments, storage manager 334 may also include a metadata manager to receive and store video metadata as tags or metadata tracks in the video data or in an associated metadata table, file, or similar data structure associated with the corresponding video data objects.

Camera RAID controller 340 may include APIs and a set of functions, parameters, and data structures for managing redundant storage of video data using a parity scheme and in-camera data storage across the non-volatile memory devices of a group of cameras. For example, camera RAID controller 340 may be replicated or distributed among the controllers of each video camera in the camera group and designate each camera's role and contents for the redundant storage of the group's video data. In some embodiments, each camera group may be configured as a RAID group where each camera contributes a data chunk to the calculation of a corresponding parity chunk and the set of data chunks and corresponding parity chunk may be treated as a RAID stripe for storage and recovery purposes. For example, the camera group may generate synchronized RAID stripes based on common timestamps, where each data collection window is defined by a starting and ending timestamp used across the video cameras to access and recovery of RAID data. In some embodiments, each video camera may be responsible for generating and storing its own timestamps, rather than receiving a synchronized timestamp, and the parity video camera may manage the synchronization of data chunks for parity calculation.

In some embodiments, camera RAID controller 340 may include a plurality of hardware and/or software modules configured to use processor 312 and memory 314 to handle or manage defined operations of camera RAID controller 340. For example, camera RAID controller 340 may include a camera group configuration 342, a peer backup engine 336, a parity camera engine 338, and a data recovery engine 344. In some embodiments, each video camera in a camera group may include peer backup engine 336 and elements of camera group configuration 342 for communication with their designated parity camera or group leader. In some embodiments, only the parity camera or group leader camera may include parity camera engine 338 and camera group configuration 342. In some embodiments, data recovery engine 344 may be selectively loaded by the parity camera, group leader, and/or replacement camera in response to the failure of a camera or its storage device (including loss or damage to the camera that renders its contents inaccessible to the camera group). In some embodiments, data recovery may be managed by another component of surveillance system 300, such as a VSaaS server remotely accessing source video data 320.1, parity data 320.3, backup data 320.4, and/or parity management log data 320.5 to generate recovered data 320.7 for the replacement video camera.

Camera group configuration 342 may include APIs and a set of functions, parameters, and data structures for determining how camera groups are configured and the topology for the RAID configuration. For example, camera group configuration 342 may include any number of video cameras, including cameras with different physical configurations (such as increased storage capacity and/or hardware assisted parity calculation for parity cameras), and correspond to any selected topology, such as the topologies described above with regard to FIGS. 2a, 2b, and 2c. In some embodiments, each video camera may be configured with its own unique identifier and group identifiers, which may be designated a source camera identifier 342.1 and source group identifier 342.2. For example, source camera identifier 342.1 may be the unique camera identifier, such as a name, identification number, network address, etc., for the camera that generated the video data and the source group identifier 342.2 may be the unique identifier, such as a group name, group number, location identifier, etc., for the camera group to which that camera is assigned. In some embodiments, peer camera identifier 342.3 and parity camera identifier 342.4 may be tags, types, and/or a reference list for the source camera identifiers 342.1 of the other video cameras in the camera group (having the same source group identifier 342.2) and, more specifically, a camera designated as parity camera or group leader (parity camera identifier 342.4). In some embodiments, peer group identifiers 342.5 may be used in topologies, such as FIG. 2a, where a relationship is established with another camera group in the same surveillance system 300. For example, the parity cameras 212.1 and 212.2 in FIG. 2a may be configured with peer group identifiers 342.5 for the video cameras in the other camera group or, at least, the other parity camera. In some embodiments, the unique identifiers in camera group configuration 342 may directly or indirectly allow each video camera to communicate with other relevant video cameras through network interface 318 and secure peer-to-peer network communication for video data transfer and messaging.

Peer backup engine 336 may include APIs and a set of functions, parameters, and data structures for supporting the redundant storage of video data from each of the video cameras in the group. For example, each video camera, including the parity camera, may instantiate some or all of peer backup engine 336 to enable sending source video data 320.1 as peer video data 320.2 to other cameras, as well as receiving and storing parity data 320.3 and/or backup data 320.4 in some configurations. In some embodiments, peer backup engine 336 may be configured to use a predetermined parity chunk size 336.1 to coordinate sending peer video data and calculation of parity for each RAID stripe. For example, parity chunk size 336.1 may be configured for the camera group based on the video parameters and a target memory size and/or average or maximum collection window to determine the size and frequency of video data chunks moving among the cameras.

Peer backup engine 336 may include a data chunk collector 336.2 configured to access or receive source video data 320.1 for replication to the parity camera. For example, data chunk collector 336.2 may receive the video data stream from video capture controller 330 as part of the video storage path. In some embodiments, data chunk collector 336.2 may write source video data 320.1 into a parity transfer data buffer 336.3 to aggregate video data from the data stream prior to transfer to the parity camera. For example, data chunk collector 336.2 may replicate video data from the source video data stream into data buffer 336.3 until parity chunk size 336.1 is reached or another chunk synchronization event is detected. In some embodiments, peer backup engine 336 may use a variable video data collection time window 336.4 to allow parity chunk size 336.1 to determine how much time is used to collect each video data chunk. For example, video data collection time window 336.4 may be different for each data chunk based on the first video camera to fill data buffer 226.3 to parity chunk size 336.1.

Due to the use of variable compression and/or different video configurations among the video cameras in the group, video cameras may not fill data buffer 336.3 at the same rate. Surveillance system 300 may coordinate among the video cameras to keep each RAID stripe synchronized for the same collection window 336.4 across all video cameras. In some embodiments, each peer backup engine 336 may include a buffer monitor 336.5 configured to continuously and/or periodically compare the valid video data in data buffer 336.3 to parity chunk size 336.1. For example, buffer monitor 336.5 may use a valid data delimiter 336.6 that corresponds to the memory space used by the video data written to data buffer 336.3. If the valid data delimiter value reaches the parity chunk size value, data collection for the current collection time window 336.4 ends and a chunk synchronization event may be detected by synchronization detector 336.7. The first video camera to detect a chunk synchronization event based on meeting parity chunk size 336.1 may be configured to send a chunk synchronization notification to each other video camera in the group using synchronization notifier 336.8. For example, responsive to detecting the chunk synchronization event, synchronization notifier 336.8 may send or broadcast a chunk synchronization notification message to each other video camera in the camera group using a peer messaging protocol among the video cameras.

Upon receipt of a chunk synchronization notification from another video camera, the receiving video camera may determine the chunk synchronization event and end the current collection time window, even though the video data in data buffer 336.3 has not met parity chunk size 336.1. For example, the valid video data, as designated by valid data delimiter 336.6, may be passed to data chunk replicator 336.9 for replication to the parity camera. In some embodiments, data chunk collector 336.2 may pad the valid video data with padding data in data buffer 336.3 and pass a data chunk with a chunk size equal to parity chunk size 336.1, even though the valid video data is less than parity chunk size 336.1. In some embodiments, only the valid video data from the data buffer may be passed and replicated to reduce the data in transit and the parity camera may pad the data to the parity chunk size as described below. In some embodiments, data chunk replicator 336.9 may be configured for a peer data channel for transferring data to the parity video camera. For example, data chunk replicator may send a replication message and/or use a direct memory access protocol, such as remote direct memory access (RDMA), to replicate the data chunk of source video data 320.2 to a peer video data buffer in the parity camera.

In some embodiments, peer backup engine 336 may be configured to receive RAID-related data from the parity camera to support distributed storage of parity and backup data. For example, if the video camera group is configured for multiplexed storage of parity and backup data, the parity camera may send parity data units and backup video data units to each video camera in turn. In some embodiments, backup/parity handler 336.10 may include an interface or function configured to receive the data from the parity camera and store it to non-volatile memory 320. For example, backup/parity handler 336.10 may receive data transfer messages and/or monitor a data transfer buffer or other storage location for receiving parity data 320.4 and/or backup data 320.4, such as a parity data chunk for the camera group or peer video data chunk for another video camera receiving the corresponding parity data chunk.

Parity camera engine 338 may include APIs and a set of functions, parameters, and data structures for calculating parity and coordinating the redundant storage of video data from each of the video cameras in the group. For example, at least one video camera may be designated as the parity camera and/or group leader and may instantiate some or all of parity camera engine 338 to enable receiving peer video data 320.2 from other cameras and calculating and storing parity data 320.3 based on the received peer video data. In some embodiments, the parity video camera may also be configured to coordinate storage of parity data 320.3 and/or backup data 320.4 to other data storage devices, which may include another camera group, distribution among the peer video cameras in the source group, and/or offload to network storage, depending on the redundancy topology being used. For example, parity camera engine 338 may store parity data locally to its own non-volatile memory 320, distribute the parity data across the non-volatile memory of each video camera in the group, and/or send the parity data to the parity camera of another camera group or network storage resource. In some embodiments, parity camera engine 338 may store parity data 320.3 in one location and offload corresponding backup data 320.4 to a different storage location. For example, when the parity camera stores parity data locally, it replicates source video data 320.1 to another location (other video cameras or network storage) or when the parity camera stores parity data in a different video camera, it stores peer video data 320.2 from that video camera locally or distributes it to another location. Note that the parity camera may also include peer backup engine 336 and the respective functions of peer backup engine 336 and parity backup engine 338 may access or otherwise interact with one another. In some embodiments, all video cameras may instantiate both peer backup engine 336 and parity camera engine 338, but only a single camera may operate as the parity camera or group leader at any given time. For example, the active parity camera could change over time (such as rotation through the group), need to be replaced if the prior parity camera or its storage device fails, or change following another device failure event or camera group reconfiguration.

Parity camera engine 338 may include a peer data collector 338.1 configured to receive peer video data 320.2 from each other video camera in the camera group. For example, responsive to a chunk synchronization event, each other storage device may send a video data chunk to the parity camera and peer data collector 338.1 may include or access a data buffer or storage location for receiving the video data chunks. In some embodiments, peer data collector 338.1 may also receive source video data 320.1 from the parity camera for use in calculating the parity data. In some embodiments, peer data collector 338.1 may receive backup data from another camera group, such as the source video data of the parity camera in that other camera group. In some embodiments, peer data collector 338.1 may receive the video data for the parity calculation in a set of registers configured to calculate parity values across the different video data sources (e.g., the video data chunk from each video camera). In some embodiments, parity camera engine 338 may be configured to use the predetermined parity chunk size 336.1 for calculating parity for each RAID stripe. For example, the set of data buffers or parity calculation registers may be configured with a memory size equal to the parity chunk size 336.1. In some embodiments, peer backup engine 336 may pad each set of valid video data collected during the collection time window to parity chunk size 336.1 to ensure that peer data collector 338.1 receives data chunks of the correct size. In some embodiments, peer backup engine 336 may send the valid video data only (without padding) from each peer video camera, and peer data collector 338.1 may receive the valid video data from each video camera and add data chunk padding 338.2 to any valid video data with a memory size less than parity chunk size 336.1.

Parity camera engine 338 may include a parity calculator 338.3 configured to calculate parity across the camera group for each set of video data chunks (and any padding). For example, parity calculator 338.3 may read bits and/or symbols from each video data chunk and use them in a XOR calculation to determine one or more parity values for parity data 320.3. In some embodiments, parity calculator 338.3 may include a hardware, software, or hardware-assisted software parity calculator. For example, parity calculator 338.3 may include a set of registers for each video data chunk and a logical gate configuration to generate the corresponding parity data in a parity calculator output register.

Parity camera engine 338 may include a parity storage manager 338.4 configured to store the calculated parity data 320.3 in non-volatile memory 320. For example, parity data may be read from an output register or data buffer and/or otherwise output from parity calculator 338.3 to non-volatile memory 320. In some embodiments, parity storage manager 338.4 may be configured to store parity data 320.3 to a storage location other than the non-volatile memory of the parity camera. For example, parity storage manager 338.4 may store parity data to another video camera or network storage resource as determined by the topology being used. In some embodiments, parity storage manager 338.4 may operate in conjunction with multiplexing logic 338.7 to distribute portions or data units of parity data 320.3, such individual or a set of sequential parity data chunks, among the non-volatile memories of the video cameras in the camera group. Parity camera engine 338 may include a parity log manager 338.5 configured to generate and store data chunk log entries for each RAID stripe, such as in parity management log 320.5. For example, a parity chunk record 320.6 may be generated for each RAID stripe and the parity chunk record may be a data structure include an entry for each video data chunk, the parity data chunk, and/or the backup data chunk (for a video camera storing the parity data chunk). In some embodiments, each data chunk entry in the parity chunk record may include the storage location, such as the LBA in the video camera storing the data, valid data delimiter value, and a set of timestamps corresponding toe the collection time window. In some embodiments, parity log manager 338.4 may be configured to backup or distribute parity management log 320.5 among the video cameras in the camera group, to another camera group, or to a network storage resource. For example, parity chunk records may accompany the parity data and/or the backup data distributed according to multiplexing logic 338.7 to assure that the parity camera does not have the only copy of parity management log 320.5.

Parity camera engine 338 may include backup manager 338.6 configured to store the backup data 320.4 corresponding to source video data 320.1 for the video camera storing parity data 320.3 in non-volatile memory 320. For example, backup data may be read from source video data 320.1 in the parity camera or peer video data 320.2 received from another camera for storage to non-volatile memory 320. In some embodiments, backup manager 338.6 may be configured to store backup data 338.6 to a storage location other than the non-volatile memory of the parity camera. For example, backup manager 338.6 may store backup data to another video camera or network storage resource as determined by the topology being used. In some embodiments, backup manager 338.6 may operate in conjunction with multiplexing logic 338.7 to distribute portions or data units of backup data 320.4, such individual or a set of sequential video data chunks, among the non-volatile memories of the video cameras in the camera group.

Parity camera engine 338 may include multiplexing logic 338.7 configured to distribute parity data 320.3, backup data 320.4, and/or parity management log 320.5 among the video cameras in the camera group. For example, multiplexing logic 338.7 may include one or more multiplexing functions to calculate or determine the sequence of video cameras to use for distributed storage of portions or data units of parity and backup data, such individual or a set of sequential video data chunks, among the non-volatile memories of the video cameras in the camera group. In some embodiments, multiplexing the parity data and backup data may occur through time division multiplexing, where video data blocks for a time window are received and processed by the parity camera, the parity data is sent to a target parity storage camera and the source video data from the target parity storage camera is sent to a target backup storage camera. For each time window and corresponding set of video data blocks, parity data, and backup data, the target parity storage camera and the target backup storage camera change. For example, the target cameras may rotate among the video cameras of the camera group in round-robin sequence or using another distribution algorithm, such as random order, prioritized based on available resources, etc.

Data recovery engine 344 may include APIs and a set of functions, parameters, and data structures for recovering redundant copies of video data for a failed video camera, video camera storage device, or a portion thereof. For example, if a video camera in the group fails or is otherwise lost, the corresponding video data from the other cameras and the parity data may be used to reconstruct recovered data 320.7 and stored to a new location, such as reconstructing the video data in a replacement camera or offloading the recovered data to a network video resource for analysis, archiving, or other use. In some embodiments, data recovery engine 344 may be instantiated on one or more video cameras in the camera group, such as the parity camera. In some embodiments, data recovery engine 344 may be selectively installed or activated after a camera failure event. In some embodiments, some or all of data recovery engine 344 may be implemented in a network resource, such as a VSaaS server and coordinate recovery over the network. For example, in the event of a failure of the parity camera, the VSaaS server may recover the backup data for the parity camera and initiate rebuild of the parity data in a replacement parity camera by reprocessing the backup data and the peer video data from the other video cameras in the group.

Network server interface 350 may include APIs and a set of functions, parameters, and data structures for interacting with a network video server, such as a VSaaS server, and/or a user display application, such as a surveillance application. For example, network server interface 350 may include a monitoring or display configuration for displaying one or more video streams in real-time or near real-time on a graphical user display of a user device and/or receive video navigation commands from the user device to selectively display stored video data from non-volatile memory 320. In some embodiments, network server interface 350 may maintain an index of real-time/near real-time video streams and/or stored video streams that are available for access by the surveillance application from the camera group. In some embodiments, the video index may include a corresponding metadata index that includes video data parameters (e.g., time, location, camera identifier, format, low light/normal light, etc.), detected video event metadata (event time, location, type, parameters, etc.), and/or video management parameters (expiration, active/archive, access control, etc.) for use in displaying and managing video data. Network server interface 350 may be configured to support the surveillance application when instantiated in the a VSaaS server, end user device, network video recorder, or another system accessible via a network within a LAN, WAN, VPN, or the internet.

Network server interface 350 may include a server authentication function 352 for validating remote access to and from the video cameras. For example, secure connection to a VSaaS server and/or surveillance applications running on another device (such as an end user device) may require each video camera to be configured with a set of mutually authenticated credentials for each remote connection. In some embodiments, a set of camera credentials and/or account credentials for the camera group may be provided to each camera, along with encryption keys or similar security elements, as well as network server identifier, such as a server name, internet protocol (IP) address, or other network routing information. For example, the set of credentials may enable an initial connection or configuration session and generate a secure authentication token stored to each video camera and/or a gateway for accessing the camera group to enable automatic initiation of a secure data transfer connection between the video cameras and the surveillance application (and its hosting device or devices).

In some embodiments, the surveillance application may include a plurality of hardware and/or software modules configured to use a processor and a memory to handle or manage defined operations of the surveillance application. For example, the surveillance application may include a video manager, an alert manager, and an analytics manager.

The video manager may include APIs and a set of functions, parameters, and data structures for navigating and displaying video streams from the video cameras and stored through video capture controller 330. For example, the video manager may include a graphical user interface and interactive controls for displaying lists, tables, thumbnails, or similar interface elements for selecting and displaying video streams for particular cameras, times, locations, and/or events. In some embodiments, the video manager may enable split screen display of multiple camera video streams. For example, the near real-time video streams (with a predetermined lag based on network lag, storage, and processing times) from all active cameras may be displayed on a monitoring interface or a set of video streams corresponding to a detected event may be displayed in an event review interface. In some embodiments, the video manager may include a data structure summarizing all video data stored in surveillance system 300 to enable the user to locate and view older surveillance video. For example, a video management log or database may include entries for stored video data indexed by related metadata, such as video data parameters (e.g., time, location, camera identifier, format, low light/normal light, etc.), detected video event metadata (event time, location, type, parameters, etc.), and/or video management parameters (expiration, active/archive, access control, etc.).

The alert manager may include APIs and a set of functions, parameters, and data structures for setting, monitoring, and displaying alerts based on detected video events. For example, the user may define a set of trigger events that generate visual, audible, tactile, and/or notification-based (electronic mail, text message, automated call, etc.) alerts to a user device. In some embodiments, the alert manager may include a plurality of preset alert conditions with associated event parameters and allow a user to enable and disable alert types and/or change associated event parameters. In some embodiments, the alert manager may be configured to operate in conjunction with event overlay function to overlay graphical elements representing detected events or event indicators on video streams displayed through the video manager. For example, detected motion, objects, or faces may be boxed or highlighted, tagged with relevant identifiers, or otherwise indicated in the video playback on the user device.

The analytics manager may include APIs and a set of functions, parameters, and data structures for selecting, training, and managing event detection algorithms. For example, the analytics manager may include a user interface to an analytical model library for one or more analytics engines, either in-camera analysis subsystems or off-camera analytics engines, such as those supported by the VSaaS server. In some embodiments, the event detection algorithms may include a set of parameters and/or model weights that are preconfigured based on training data sets processed independent of surveillance system 300. For example, the analytics manager may include object detection algorithms for common objects, situations, and camera configurations. In some embodiments, the analytics manager may include access to training services and/or preconfigured training data sets. For example, the analytics manager may enable the user to define training data sets for determining or refining event detection algorithm parameters and/or model weights based on predefined base algorithms or models. In some embodiments, the analytics manager may interface directly with an analytics engine for selecting, training, managing, and using the event detection algorithms configured through the analytics manager.

Figure 4:
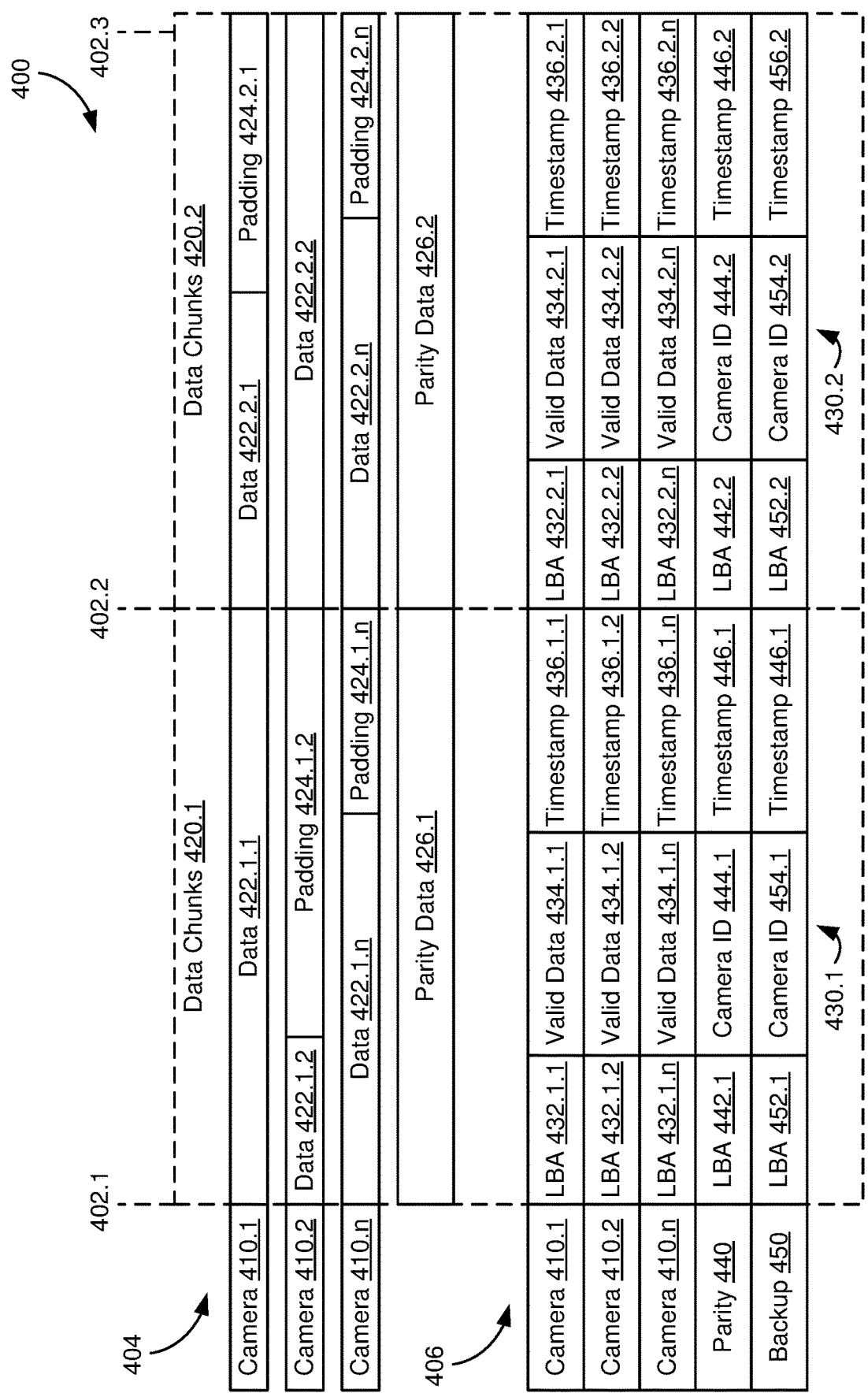
FIG. 4 schematically illustrates example variable stream size management for the computer-based surveillance system of FIG. 1.

FIG. 4 shows an example variable stream size management architecture 400 for the computer-based surveillance systems of FIGS. 1-3. While architecture 400 is shown for three cameras 410.1-410.n, it may be applied to any number of video cameras in a camera group. Architecture 400 is silent on the storage location for parity data 426, as the architecture may be applied to any of the topologies or configurations described above. Architecture 400 shows two sequential video data collection time windows, from timestamps 402.1 to 402.2 and from timestamps 402.2 to 402.3, but the pattern may be continued for any number of sequential video data collection time windows. The upper portion of architecture 400 corresponds to a configuration 404 of data chunks for each RAID stripe and the lower portion of architecture 400 corresponds to a parity management log 406 for each RAID stripe or corresponding parity chunk record.

In the example shown, at timestamp 402.1, a new data collection time window may begin and provide a data collection time window start timestamp. Cameras 410.1-410.n may each start collecting video data from their respective image sensors and processed through their respective encoders (and variable compression codecs). The data collection time window may extend until the compressed video stream data of the first of the video cameras meets a parity chunk size. In the example shown, the valid video data 422.1.1 of video camera 410.1 reaches the parity chunk size first and triggers the end timestamp 402.2. In some embodiments, a notification of a chunk synchronization event may also be triggered and sent to the parity video camera and/or the other video cameras 410.2-410.n. In some embodiments, the parity video camera may receive or determine the chunk synchronization event and manage chunk synchronization without notification to the other video cameras. Padding 424.1.2 and padding 424.1.n are added to valid video data 422.1.2 and valid video data 422.1.n respectively to meet the parity chunk size. The valid video data plus any added padding may then be used to calculate parity data 426.1, such that the video data chunks 420.1 and parity data 426.1 make a complete RAID stripe that redundantly protects the video data from each camera 410.1-410.n.

In some embodiments, a corresponding parity chunk record 430.1 may be generated for parity management log 406. Parity chunk record 430.1 may include an camera entry for each video data chunk stored in the respective video cameras 410.1-410.n. In the example shown, a storage location, such as LBAs 432.1.1-432.1.n, a valid data value, such as valid data delimiters 434.1,1-434.1.n, and timestamp information 436.1.1-436.1.n may be included for each video camera to describe where the source video data is located in each source camera and how it corresponds to the valid video stream and timing of the source video data. This location and timing information may be used for selectively recovering video data based on parity data 426.1 and remaining data chunks from data chunks 420.1. In some embodiments, parity chunk record 430.1 may also include storage location and timing information for parity data and backup data. For example, parity data entry 440 may include storage location information, including both LBA 442.1 and the video camera identifier 444.1 for the video camera storing the parity data, and timing information for the data collection time window, such as start timestamp 402.1 and end timestamp 402.2. Backup data entry 450 for the camera group backup data may include storage location information, including both LBA 452.1 and the video camera identifier 444.1 for the video camera storing the backup data (or backup camera), and timing information for the data collection time window and valid data of the video data chunk being backed up. The same subentries and corresponding parameters for other video data chunks may be included in each other parity chunk record, such as parity chunk records 430.2 for data chunks 420.2. In some embodiments, the parity camera may not receive LBA or other storage location information from other cameras 410 and may rely on camera identifiers, timestamps, and valid data information for the retrieval of data chunks during recovery operations.

In the example shown, at timestamp 402.2, a next data collection time window may begin and provide a next data collection time window start timestamp for data chunks 420.2. Cameras 410.1-410.n may each start collecting the next chunk of video data from their respective image sensors and processed through their respective encoders (and variable compression codecs). The data collection time window will again extend until the first of the video cameras meets a parity chunk size. In the example shown, the valid video data 422.2.2 of video camera 410.2 reaches the parity chunk size first and triggers the end timestamp 402.3. Padding 424.2.1 and padding 424.2.n are added to valid video data 422.2.1 and valid video data 422.2.n respectively to meet the parity chunk size. The valid video data plus any added padding may then be used to calculate parity data 426.2, such that the video data chunks 420.2 and parity data 426.2 make another complete RAID stripe that redundantly protects the video data from each camera 410.1-410.*n*. In some embodiments, the parity video camera may manage the determination of data collection time windows and generation of parity management log 406 with limited data transfer from the peer video cameras. For example, the parity video camera may be configured to determine the valid data and timestamp information for each camera based on parsing the received video data and/or corresponding metadata (e.g., by finding the start and stop timestamps in each video stream for the data collection time window and determining the valid data size between those timestamps).

Figure 5A:
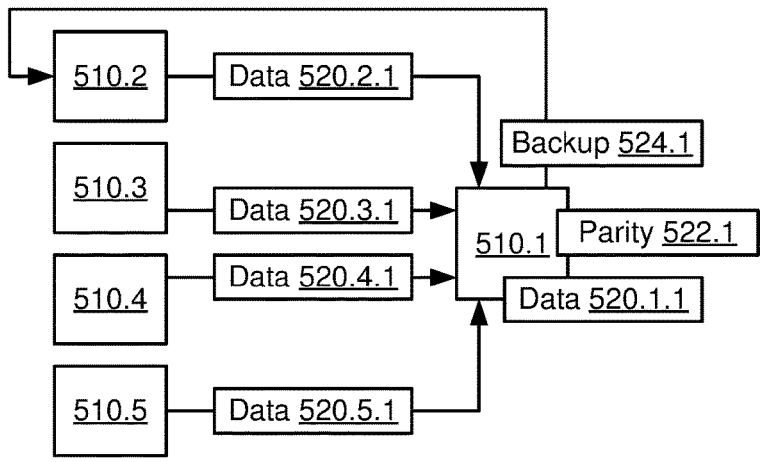
FIG. 5a schematically illustrates an example multiplexed redundant storage scheme for a video data unit stored by the computer-based surveillance system of FIG. 1.
Figure 5B:
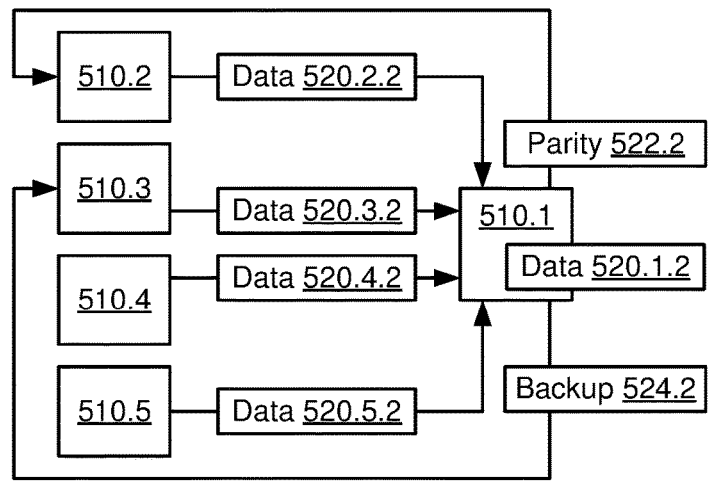
FIG. 5b schematically illustrates an example multiplexed redundant storage scheme for another video data unit stored by the computer-based surveillance system of FIG. 1.
Figure 5C:
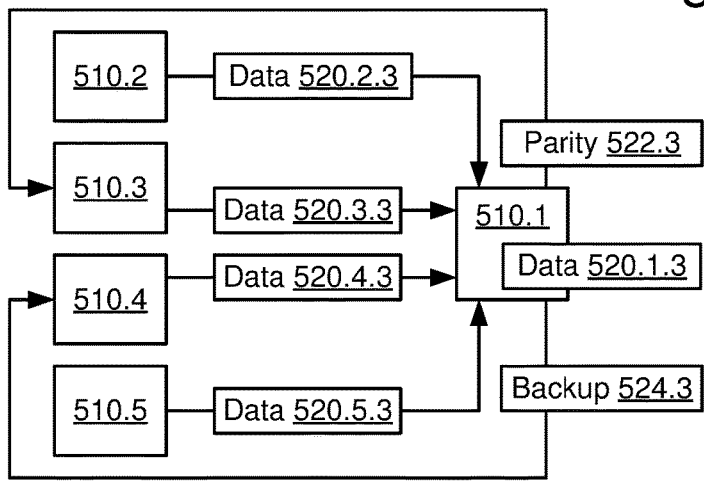
FIG. 5c schematically illustrates an example multiplexed redundant storage scheme for still another video data unit stored by the computer-based surveillance system of FIG. 1.

FIGS. 5*a*-5*c* show a series of example distributions of parity and backup data in a multiplexed video camera topology 500 for redundant storage across a video camera group including video cameras 510.1-510.5. In the example shown, video camera 510.1 may be configured as a parity camera and video cameras 510.2-510.5 may be configured as peer video cameras. In FIG. 5*a*, a first RAID stripe may be calculated by collecting peer video data 520.2.1, 520.3.1. 520.4.1, 520.5.1 and source video data 520.1.1 to calculate parity 522.1. At this first time and for a first collection time window, video camera 510.1 may store parity 522.1 locally in its non-volatile storage and send backup 524.1, replicating its own source video data 520.1.1, to target video camera 510.2 as backup camera.

In FIG. 5*b*, a second RAID stripe may be calculated by collecting peer video data 520.2.2, 520.3.2. 520.4.2, 520.5.2 and source video data 520.1.2 to calculate parity 522.2. At this second time and for a second collection time window, video camera 510.1 may send parity 522.2 to target video camera 510.2 to store in its non-volatile storage and send backup 524.2, replicating peer video data 520.2.2 from video camera 510.2, to target video camera 510.3 as backup camera.

In FIG. 5*c*, a third RAID stripe may be calculated by collecting peer video data 520.2.3, 520.3.3. 520.4.3, 520.5.3 and source video data 520.1.3 to calculate parity 522.3. At this third time and for a third collection time window, video camera 510.1 may send parity 522.3 to target video camera 510.3 to store in its non-volatile storage and send backup 524.3, replicating peer video data 520.3.3 from video camera 510.3, to target video camera 510.4 as backup camera. This approach of rotating the video cameras receiving parity data and backup data may continue across any number of cameras and may be repeated in a round-robin fashion (periodically repeating the configurations shown in FIGS. 5*a*-5*c*). In some embodiments, the role of parity camera itself may rotate among video cameras with the determined parity camera for each RAID stripe and selected data collection time window fulfilling the functions of video camera 510.1. Note that different orders and patterns for distributing the parity data and backup data among the video cameras are possible.

Figure 6:
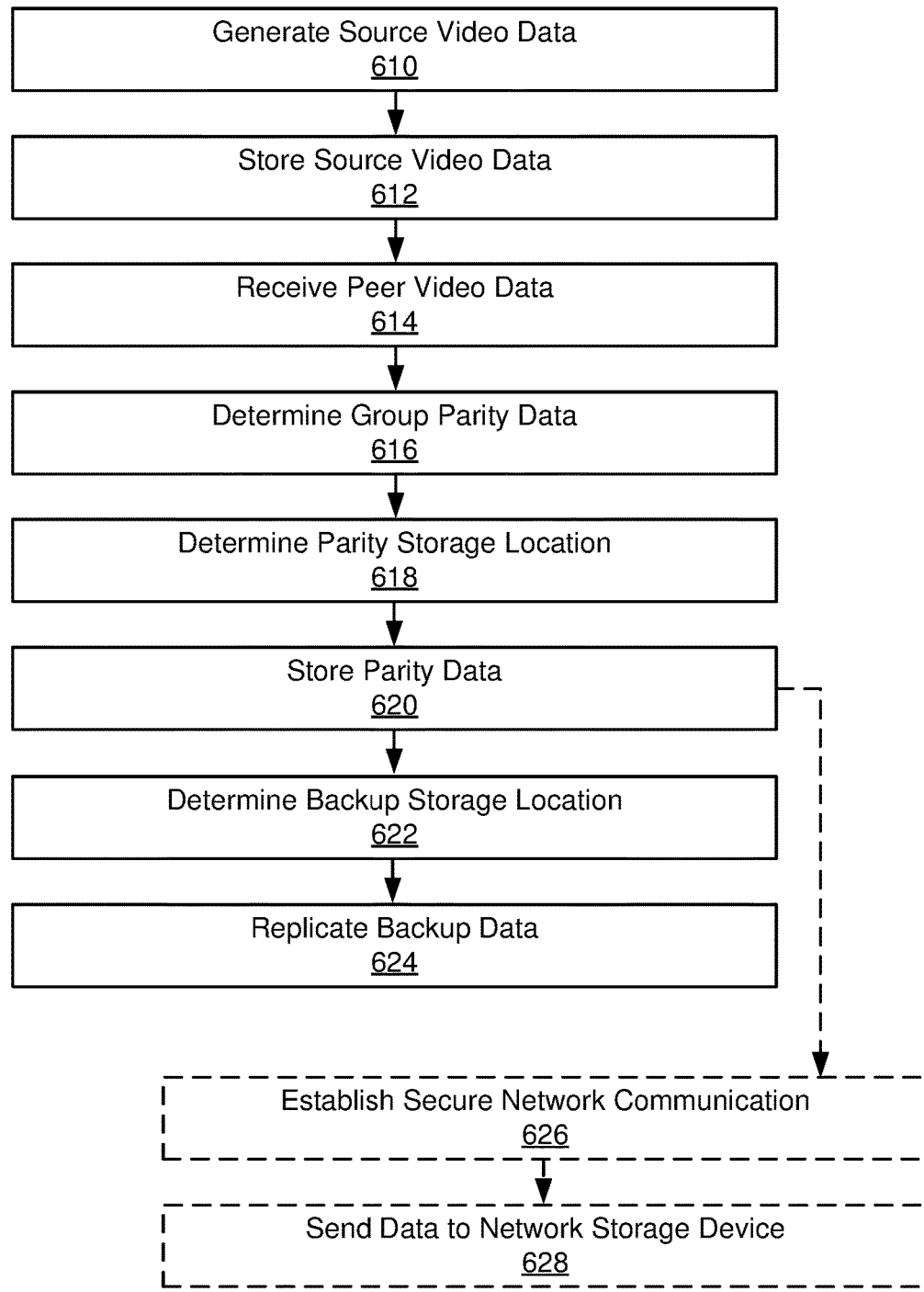
FIG. 6 is a flowchart of an example method of redundant storage of video data in on-camera non-volatile memory for a video camera configured as a parity camera.

As shown in FIG. 6, surveillance system 300 may be operated according to an example method of redundant storage of video data in on-camera non-volatile memory for a video camera configured as a parity camera, i.e., according to method 600 illustrated by blocks 610-628 in FIG. 6.

At block 610, source video data may be generated by a video camera. For example, a parity camera may generate and encode video data from its image sensor.

At block 612, the source video data may be stored by the video camera. For example, the parity camera may write a data chunk from the source video data to its non-volatile memory.

At block 614, peer video data may be received from a plurality of peer video cameras. For example, the parity camera may be configured as part of a camera group and receive video data captured by each of the other cameras during the same data collection window.

At block 616, parity data for the group of video cameras may be determined. For example, the parity camera may calculate parity data based on data chunks from each video camera.

At block 618, a storage location for the parity data may be determined. For example, the parity camera may be configured to store the parity data in its own non-volatile memory, the non-volatile memory of another video camera, or a network storage location, depending on the configuration.

At block 620, the parity data may be stored. For example, the parity camera may store the parity data itself or replicate it to another video camera. In an alternate embodiment, the parity camera may be configured to use a network storage resource and method 600 may proceed to block 626.

At block 622, a backup storage location may be determined. For example, the parity camera may determine a video camera to receive a copy of the video data for the data chunk from the video camera storing the parity data, such as its source video data if the parity camera is storing the parity data or the peer video data of a different video camera storing the parity data.

At block 624, the backup data may be replicated to the backup storage location. For example, the parity camera may store or send the video data for backup to the backup storage location determined at block 622. In some embodiments, once the parity data is successfully stored, the parity camera may delete the received peer video data and prepare for the next set of synchronized data chunks.

At block 626, secure network communication may be established with network storage device. For example, the parity camera may be configured with credentials for a secure connection with a VSaaS server or another network storage device.

At block 628, the parity data may be sent to a network storage device. For example, the parity camera may send the parity data to a VSaaS server or another network storage device over the secure network connection.

Figure 7:
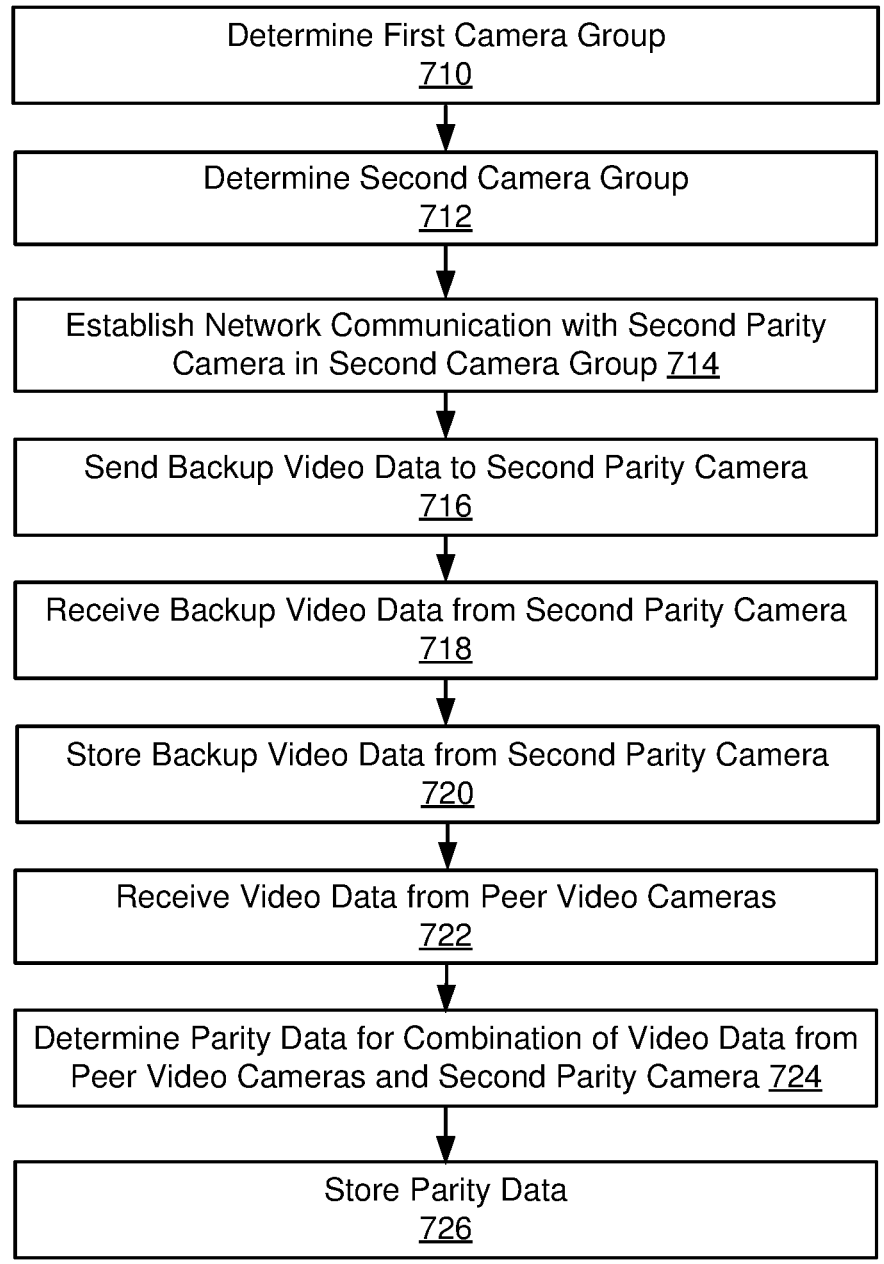
FIG. 7 is a flowchart of an example method of redundant storage of video data in on-camera non-volatile memory for a video camera configured as a parity camera in a multi-group configuration.

As shown in FIG. 7, surveillance system 300 may be operated according to an example method for redundant storage of video data in on-camera non-volatile memory for a video camera configured as a parity camera in a multi-group configuration, i.e., according to method 700 illustrated by blocks 710-726 in FIG. 7.

At block 710, a first camera group may be determined. For example, a surveillance system may be configured with a first camera group comprised of multiple video cameras, at least one of which is designated as a parity camera for the first camera group. In some embodiments, the designated parity camera may be dynamically determined by that camera group and/or may rotate among peer video cameras in the camera group.

At block 712, a second camera group may be determined. For example, the surveillance system may be configured with a second camera group comprised of multiple video cameras that do not include video cameras from the first camera group. At least one of the second camera group may also be designated as a parity camera for the second camera group.

At block 714, network communication may be established between the first parity camera in the first camera group and the second parity camera in the second camera group. For example, the two parity cameras may be configured with camera identifiers and network addresses to enable network communication between the parity cameras.

At block 716, backup video data for the first camera group may be sent to the second parity camera in the second camera group. For example, the first parity camera may be configured to select the second parity camera as the backup storage location for backup data from the first camera group, such as first group parity data or backup video data from the video camera in the first camera group storing the first group parity data, which may be the first parity camera.

At block 718, backup video data may be received from the second parity camera. For example, the first parity camera may receive backup data from the second camera group through the second parity camera.

At block 720, backup video data from the second parity camera may be stored. For example, the first parity camera may be configured to store backup video data from the second parity camera to a video data buffer for use in generating parity data or to non-volatile memory for storage.

At block 722, video data may be received from peer video cameras in the first camera group. For example, the parity camera may receive peer video data in synchronized data chunks from the other video cameras in the first camera group.

At block 724, parity data may be determined for the combination of video data from peer video cameras and backup video data from the second parity camera. For example, the first parity camera may calculate parity across synchronized video data chunks from the peer storage devices and the backup video data from the second parity camera. In some embodiments, the source video data from the first parity camera, which was backed up to the second parity camera at block 716, may not be used in the parity calculation.

At block 726, the parity data may be stored in non-volatile memory. For example, the first parity camera may store the parity data in its non-volatile memory or send it to another storage location, as described above with regard to method 600 in FIG. 6. In some embodiments, the first peer video camera may then delete the peer video data and backup video data from its memory.

Figure 8:
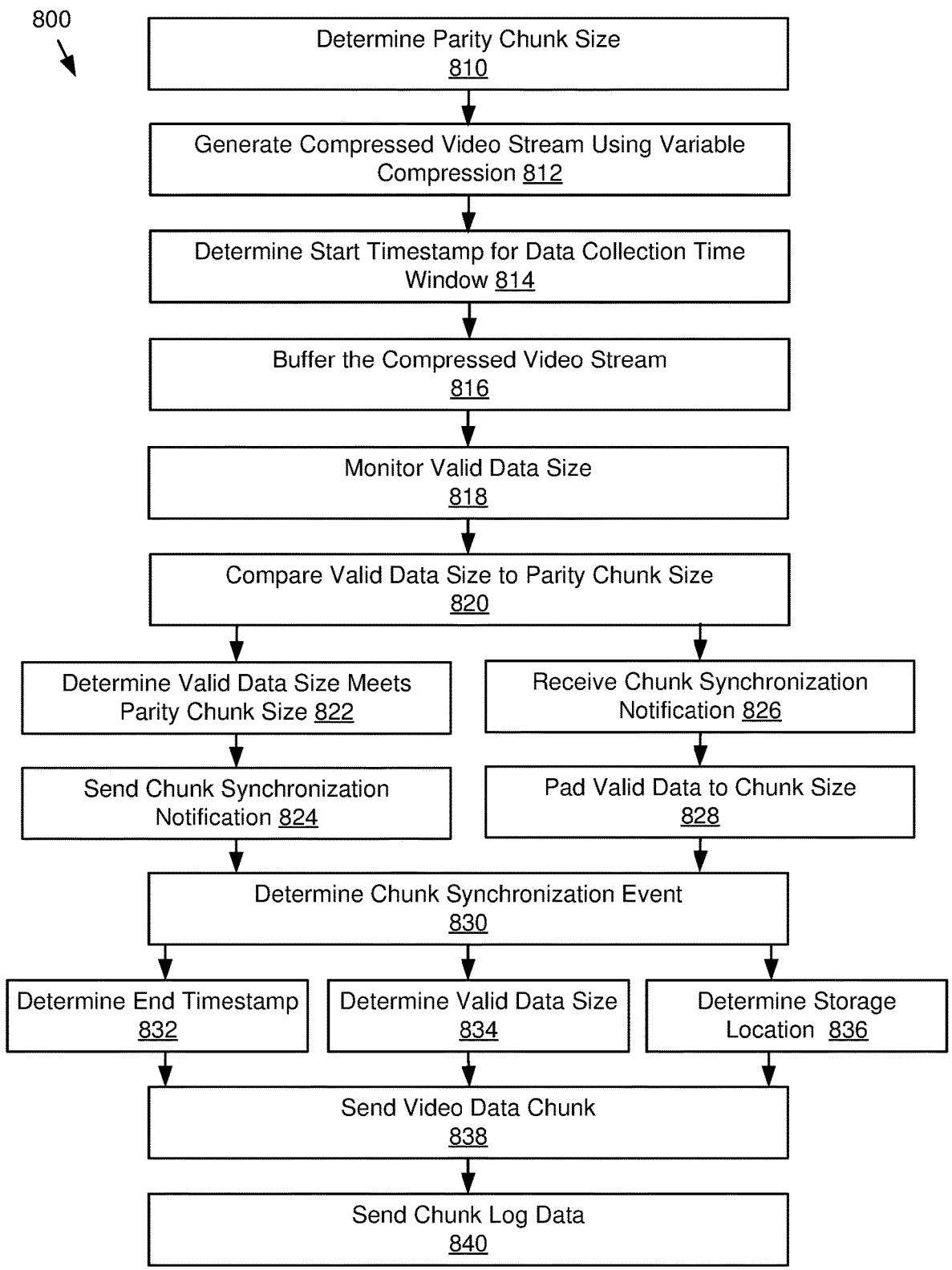
FIG. 8 is a flowchart of an example method of redundant storage of video data in on-camera non-volatile memory for a video camera configured as a peer camera.

As shown in FIG. 8, surveillance system 300 may be operated according to an example method for redundant storage of video data in on-camera non-volatile memory for a video camera configured as a peer camera, i.e., according to method 800 illustrated by blocks 810-840 in FIG. 8.

At block 810, a parity chunk size may be determined. For example, each video camera configured for synchronized chunks of video data may include a parity chunk size parameter configured for a predetermined memory size for the synchronized data chunks.

At block 812, a compressed video stream may be generated using variable compression. For example, each video camera may include a codec and various encoding parameters from taking the raw video data from their image sensors and encoding it in a common video format used by the surveillance system to reduce the amount of memory/storage space and network bandwidth to handle the video data.

At block 814, a start timestamp may be determined for a data collection time window. For example, the video cameras may be initiated or synchronized to a start timestamp and, once operating, use the end timestamp of the prior synchronized data chunk as the start timestamp for the next synchronized data chunk.

At block 816, the compressed video stream may be buffered to a memory buffer. For example, each video camera may include a memory buffer for receiving the encoded and compressed video data during the data collection time window.

At block 818, the valid data size may be monitored. For example, each video camera may monitor the memory space used by the video data written to the memory buffer since the start timestamp to track a valid data delimiter value.

At block 820, the valid data size in the memory buffer may be compared to the parity chunk size. For example, each video camera may compare the valid data delimiter value to the parity chunk size to determine when and whether the valid data size meets the parity chunk size.

At block 822, the valid data size may be determined to meet the parity chunk size. For example, the amount of valid video data written to the data buffer may reach the parity chunk size and the first video camera to determine this condition may set the end timestamp for the data collection time window.

At block 824, a chunk synchronization notification may be sent. For example, the first video camera to reach the parity chunk size may generate and send the chunk synchronization notification with the end timestamp to each other video camera in the camera group.

At block 826, a chunk synchronization notification may be received. For example, each video camera that was not the first to meet the parity chunk size may receive the chunk synchronization notification from the first video camera determined at block 822.

At block 828, valid video data may be padded to the parity chunk size. For example, each video camera with valid video data in their respective data buffers less than the parity chunk size may add padding data until the resulting chunk size meets the parity chunk size.

At block 830, a chunk synchronization event may be determined. For example, all video cameras synchronizing data chunks for parity calculation may recognize from the chunk synchronization notification (either generating it or receiving it) that the data collection time window has closed and the resulting video data chunks may be processed.

At block 832, an end timestamp may be determined. For example, each video camera may determine its end timestamp for the last valid video data added to the data buffer.

At block 834, a valid data size may be determined. For example, each video camera may determine the valid data delimiter value for the video data in the memory buffer at the end timestamp.

At block 836, a storage location may be determined. For example, each video camera may determine the storage location in their non-volatile memory where the valid video data of the video data chunk has been stored, such as the LBA in the video camera's non-volatile memory.

At block 838, the video data chunk may be sent. For example, each video camera may send the video data chunk, some of which may include both valid video data and padding data, to the video camera designated as the parity camera.

At block 840, the chunk log data may be sent. For example, each video camera may send the start and end timestamps, valid data size, and storage location for the video data chunk to the parity camera.

Figure 9:
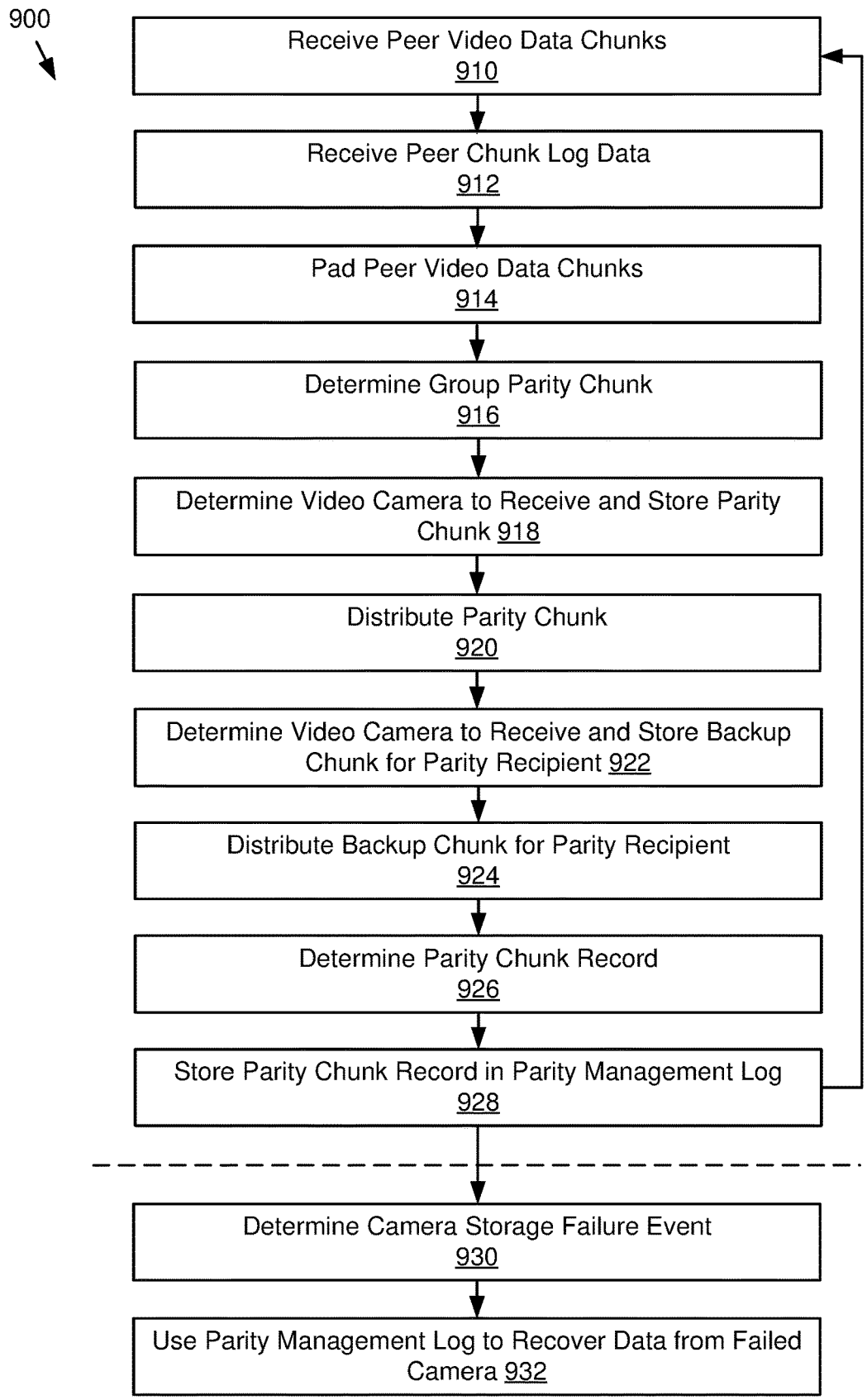
FIG. 9 is a flowchart of an example method of using multiplexing for redundant storage of video data in on-camera non-volatile memory for a video camera configured as a parity camera.

As shown in FIG. 9, surveillance system 300 may be operated according to an example method for using multiplexing for redundant storage of video data in on-camera non-volatile memory for a video camera configured as a parity camera, i.e., according to method 900 illustrated by blocks 910-932 in FIG. 9.

At block 910, peer video data chunks may be received. For example, a parity camera may receive synchronized chunks of peer video data from each other video camera in a camera group.

At block 912, peer chunk log data may be received. For example, the parity camera may receive metadata parameters describing the source video chunks and their storage location for each peer video data chunk received.

At block 914, peer video data chunks may be padded to meet the parity chunk size. For example, the parity camera may receive video data chunks of compressed video data equal to or less than the parity chunk size and selectively pad video data chunks that are less than the parity chunk size to meet the parity chunk size, so that the resulting video data chunks are the same size.

At block 916, a group parity chunk may be determined. For example, the parity camera may calculate parity data corresponding to the XOR of the synchronized video data chunks from the camera group and the resulting parity data chunk, along with the source video data chunks, may comprise a RAID stripe.

At block 918, a video camera to receive and store the parity chunk may be determined. For example, the parity camera may select, using multiplexing logic, a video camera in the camera group (including itself) to receive and store the parity data chunk.

At block 920, the parity chunk may be distributed to the video camera selected at block 918. For example, for each parity chunk calculated, the parity camera may select different cameras to distribute the parity chunks among all of the video cameras in the camera group.

At block 922, a video camera to receive and store a backup chunk for the parity recipient may be determined. For example, the parity camera may select a different camera to receive the video data chunk that was received from the video camera selected at block 918.

At block 924, the backup chunk may be distributed to the video camera selected at block 922. For example, for each parity chunk recipient selected at block 918, the parity camera may select different cameras to distribute the backup chunks among all of the video cameras in the camera group.

At block 926, a parity chunk record may be determined. For example, the parity camera may aggregate the peer chunk log data from the video cameras in the group for the synchronized video data chunks into a parity chunk record for the RAID stripe.

At block 928, the parity chunk record may be stored in a parity management log. For example, the parity camera may store the parity chunk record determined at block 926 in a parity management log in the parity camera's non-volatile memory. In some embodiments, the parity camera may be configured to distribute backup of the parity chunk records, such as with the parity data, the backup video data, to another video camera, and/or to a network video storage server.

In some embodiments, the operation of method 900 may return to block 910 for a next set of synchronized data chunks for parity calculation and distribution among the camera group. A failure event, such as the loss or failure of one of the video cameras in the camera group and/or its non-volatile memory, may trigger method 900 to proceed to block 930.

At block 930, a camera storage failure event may be determined. For example, the parity camera or another component of the surveillance system may determine that a video camera is no longer available for video data storage.

At block 932, the parity management log may be used to locate source video data, parity data, and backup data to recover the video data of the failed camera. For example, the parity camera or another component of the surveillance system may use the parity management log to locate the video data blocks and parity blocks for each RAID stripe from the source video data, parity data, and/or backup data, then use the video data blocks and parity blocks to rebuild recovered data in the non-volatile memory of a replacement video camera or another storage location for recovered data.

While at least one exemplary embodiment has been presented in the foregoing detailed description of the technology, it should be appreciated that a vast number of variations may exist. It should also be appreciated that an exemplary embodiment or exemplary embodiments are examples, and are not intended to limit the scope, applicability, or configuration of the technology in any way. Rather, the foregoing detailed description will provide those skilled in the art with a convenient road map for implementing an exemplary embodiment of the technology, it being understood that various modifications may be made in a function and/or arrangement of elements described in an exemplary embodiment without departing from the scope of the technology, as set forth in the appended claims and their legal equivalents.

As will be appreciated by one of ordinary skill in the art, various aspects of the present technology may be embodied as a system, method, or computer program product. Accordingly, some aspects of the present technology may take the form of an entirely hardware embodiment, an entirely software embodiment (including firmware, resident software, micro-code, etc.), or a combination of hardware and software aspects that may all generally be referred to herein as a circuit, module, system, and/or network. Furthermore, various aspects of the present technology may take the form of a computer program product embodied in one or more computer-readable mediums including computer-readable program code embodied thereon.

Any combination of one or more computer-readable mediums may be utilized. A computer-readable medium may be a computer-readable signal medium or a physical computer-readable storage medium. A physical computer readable storage medium may be, for example, but not limited to, an electronic, magnetic, optical, crystal, polymer, electromagnetic, infrared, or semiconductor system, apparatus, or device, etc., or any suitable combination of the foregoing. Non-limiting examples of a physical computer-readable storage medium may include, but are not limited to, an electrical connection including one or more wires, a portable computer diskette, a hard disk, random access memory (RAM), read-only memory (ROM), an erasable programmable read-only memory (EPROM), an electrically erasable programmable read-only memory (EEPROM), a Flash memory, an optical fiber, a compact disk read-only memory (CD-ROM), an optical processor, a magnetic processor, etc., or any suitable combination of the foregoing. In the context of this document, a computer-readable storage medium may be any tangible medium that can contain or store a program or data for use by or in connection with an instruction execution system, apparatus, and/or device.

Computer code embodied on a computer-readable medium may be transmitted using any appropriate medium, including but not limited to, wireless, wired, optical fiber cable, radio frequency (RF), etc., or any suitable combination of the foregoing. Computer code for carrying out operations for aspects of the present technology may be written in any static language, such as the C programming language or other similar programming language. The computer code may execute entirely on a user's computing device, partly on a user's computing device, as a stand-alone software package, partly on a user's computing device and partly on a remote computing device, or entirely on the remote computing device or a server. In the latter scenario, a remote computing device may be connected to a user's computing device through any type of network, or communication system, including, but not limited to, a local area network (LAN) or a wide area network (WAN), Converged Network, or the connection may be made to an external computer (e.g., through the Internet using an Internet Service Provider).

Various aspects of the present technology may be described above with reference to flowchart illustrations and/or block diagrams of methods, apparatus, systems, and computer program products. It will be understood that each block of a flowchart illustration and/or a block diagram, and combinations of blocks in a flowchart illustration and/or block diagram, can be implemented by computer program instructions. These computer program instructions may be provided to a processing device (processor) of a general purpose computer, special purpose computer, or other programmable data processing apparatus to produce a machine, such that the instructions, which can execute via the processing device or other programmable data processing apparatus, create means for implementing the operations/acts specified in a flowchart and/or block(s) of a block diagram.

Some computer program instructions may also be stored in a computer-readable medium that can direct a computer, other programmable data processing apparatus, or other device(s) to operate in a particular manner, such that the instructions stored in a computer-readable medium to produce an article of manufacture including instructions that implement the operation/act specified in a flowchart and/or block(s) of a block diagram. Some computer program instructions may also be loaded onto a computing device, other programmable data processing apparatus, or other device(s) to cause a series of operational steps to be performed on the computing device, other programmable apparatus or other device(s) to produce a computer-implemented process such that the instructions executed by the computer or other programmable apparatus provide one or more processes for implementing the operation(s)/act(s) specified in a flowchart and/or block(s) of a block diagram.

A flowchart and/or block diagram in the above figures may illustrate an architecture, functionality, and/or operation of possible implementations of apparatus, systems, methods, and/or computer program products according to various aspects of the present technology. In this regard, a block in a flowchart or block diagram may represent a module, segment, or portion of code, which may comprise one or more executable instructions for implementing one or more specified logical functions. It should also be noted that, in some alternative aspects, some functions noted in a block may occur out of an order noted in the figures. For example, two blocks shown in succession may, in fact, be executed substantially concurrently, or blocks may at times be executed in a reverse order, depending upon the operations involved. It will also be noted that a block of a block diagram and/or flowchart illustration or a combination of blocks in a block diagram and/or flowchart illustration, can be implemented by special purpose hardware-based systems that may perform one or more specified operations or acts, or combinations of special purpose hardware and computer instructions.

While one or more aspects of the present technology have been illustrated and discussed in detail, one of ordinary skill in the art will appreciate that modifications and/or adaptations to the various aspects may be made without departing from the scope of the present technology, as set forth in the following claims.

The invention claimed is:

1. A system, comprising:
a first video camera comprising:
at least one image sensor configured to capture video images;
a network port configured for communication with a first plurality of peer video cameras over a network;
a non-volatile memory configured to store source video data captured by the at least one image sensor; and
an integrated circuit configured to:
determine a chunk synchronization event signaling an end of a data collection time window;
receive, responsive to the chunk synchronization event, peer video data from the first plurality of peer video cameras, wherein the peer video data includes video data chunks corresponding to video stream data generated by each peer video camera during the data collection time window;
determine, based on the video data chunks from the peer video cameras for the data collection time window, parity data for a parity chunk; and
store the parity data in the non-volatile memory.

2. The system of claim 1, further comprising:
the first plurality of peer video cameras, wherein the first plurality of peer video cameras and the first video camera comprise a first camera group; and
a second plurality of video cameras, wherein:
the second plurality of video cameras comprises a second camera group configured for communication over the network; and
the integrated circuit of the first video camera is further configured to send, to a target video camera among the second plurality of video cameras, first camera group backup data comprising at least one of:
the source video data for the first video camera; or
the parity data for the first camera group.

3. The system of claim 2, wherein the integrated circuit of the first video camera is further configured to:
receive, from the second camera group, second camera group backup data comprising at least one of:
video data from the second camera group; or
parity data for the second camera group; and
store, in the non-volatile memory of the first video camera, the second camera group backup data.

4. The system of claim 1, wherein the integrated circuit of the first video camera is further configured to:
establish secure network communication with a video storage server; and
send, to the video storage server, first camera group backup data comprising at least one of:
the source video data for the first video camera; or
the parity data for a first camera group including the first video camera and the first plurality of peer video cameras.

5. The system of claim 1, further comprising:
the first plurality of peer video cameras, wherein:
the peer video data includes a compressed video stream from each peer video camera of the first plurality of peer video cameras; and
each peer video camera of the first plurality of peer video cameras is configured to:

generate the compressed video stream using variable compression;
determine a parity chunk size;
determine the chunk synchronization event signaling the end of the data collection time window; and
send, responsive to the chunk synchronization event, a video data chunk corresponding to compressed video stream data generated during the data collection time window.

6. The system of claim 5, wherein the integrated circuit is further configured to pad the video data chunk from each peer video camera to meet the parity chunk size prior to determining the parity data for the parity chunk.

7. The system of claim 5, wherein:
each peer video camera of the first plurality of peer video cameras is further configured to:
determine a start timestamp for the data collection time window;
buffer, to a data buffer, the compressed video stream starting from the start timestamp;
monitor a valid data size of the compressed video stream in the data buffer; and
selectively send, responsive to the valid data size for that peer video camera meeting the parity chunk size, a chunk synchronization notification to each other peer video camera; and
the chunk synchronization notification:
signals the chunk synchronization event for each peer video camera; and
includes an end timestamp for the data collection time window.

8. The system of claim 5, wherein:
each peer video camera of the first plurality of peer video cameras is further configured to send, to the first video camera, a valid data size for the video data chunk;
the integrated circuit of the first video camera is further configured to store a parity chunk record for the parity chunk in a parity management log; and
the parity chunk record includes:
a start timestamp for the data collection time window; and
for each video data chunk used to determine the parity chunk, the valid data size for that video data chunk.

9. The system of claim 1, wherein the integrated circuit of the first video camera is further configured to:
determine, for a first data collection time window, a first parity block for the parity data of the first plurality of peer video cameras;
store the first parity block in the non-volatile memory;
send the source video data for the first data collection time window to a first target peer video camera in the first plurality of peer video cameras;
determine, for a second data collection time window, a second parity block for the parity data of the first plurality of peer video cameras;
send the second parity block to the first target peer video camera; and
send a video data chunk from the first target peer video camera in the second data collection time window to a second target peer video camera in the first plurality of peer video cameras.

10. The system of claim 1, wherein:
the first plurality of peer video cameras and the first video camera comprise a first camera group;
each video camera in the first camera group is configured to, for a plurality of data collection time windows:
determine, for a selected data collection time window, a parity camera from the first camera group;
store, at the determined parity camera, parity data for the selected data collection time window;
determine, for the selected data collection time window, a backup camera from the first camera group; and
send, from the parity camera to the backup camera, backup data corresponding to the selected data collection time window; and
the first camera group determines:
the parity camera for each data collection time window to distribute the parity data among video cameras in the first camera group; and
the backup camera for each data collection time window to distribute the backup data to a different video camera than a video camera storing corresponding parity data.

11. A computer-implemented method, comprising:
generating, by a first plurality of peer video cameras, peer video data;
storing, by the first plurality of peer video cameras, the peer video data in non-volatile memories of the first plurality of peer video cameras;
determining a chunk synchronization event signaling an end of a data collection time window;
sending, by each peer video camera of the first plurality of peer video cameras and responsive to the chunk synchronization event, a video data chunk corresponding to video stream data generated during the data collection time window;
receiving, by a parity video camera and over a network, peer video data from the first plurality of peer video cameras;
determining, by the parity video camera and based on the video data chunk from each peer video camera for the data collection time window, parity data for a parity chunk for the first plurality of peer video cameras; and
storing, by the parity video camera, the parity data in a non-volatile memory of the parity video camera.

12. The computer-implemented method of claim 11, further comprising:
sending, to a target video camera among a second plurality of video cameras, first camera group backup data comprising at least one of:
source video data for the parity video camera; or
the parity data for a first camera group;
wherein:
the first plurality of peer video cameras and the parity video camera comprise the first camera group; and
the second plurality of video cameras comprise a second camera group configured for communication over the network.

13. The computer-implemented method of claim 11, further comprising:
establishing, from the parity video camera, secure network communication with a video storage server; and
sending, by the parity video camera and to the video storage server, first camera group backup data comprising at least one of:
source video data for the parity video camera; or
the parity data for the first plurality of peer video cameras.

14. The computer-implemented method of claim 11, further comprising:
determining a parity chunk size; and generating, by each peer video camera of the first plurality of peer video cameras, a compressed video stream using variable compression, wherein the corresponding video data chunk is comprised of video stream data from the compressed video stream.

15. The computer-implemented method of claim 14, further comprising:
padding the video data chunk from each peer video camera to meet the parity chunk size prior to determining the parity data for the parity chunk.

16. The computer-implemented method of claim 14, further comprising:
determining a start timestamp for the data collection time window;
buffering, to a data buffer in each peer video camera of the first plurality of peer video cameras, the compressed video stream starting from the start timestamp;
monitoring, by each peer video camera of the first plurality of peer video cameras, a valid data size of the compressed video stream in the data buffer; and
selectively sending, by at least one peer video camera of the first plurality of peer video cameras and responsive to the valid data size for that peer video camera meeting the parity chunk size, a chunk synchronization notification to each other peer video camera, wherein the chunk synchronization notification:
signals the chunk synchronization event for each peer video camera; and
includes an end timestamp for the data collection time window.

17. The computer-implemented method of claim 14, further comprising:
sending, to the parity video camera by each peer video camera of the first plurality of peer video cameras, a valid data size for the video data chunk; and
storing, by the parity video camera, a parity chunk record for the parity chunk in a parity management log, wherein the parity chunk record includes:
a start timestamp for the data collection time window; and
for each video data chunk used to determine the parity chunk, the valid data size for that video data chunk.

18. The computer-implemented method of claim 11, further comprising:
determining, by the parity video camera and for a first data collection time window, a first parity block for the parity data of the first plurality of peer video cameras;
storing, by the parity video camera, the first parity block in the non-volatile memory of the parity video camera;
sending, by the parity video camera, source video data generated by the parity video camera for the first data collection time window to a first target peer video camera in the first plurality of peer video cameras;
determining, by the parity video camera and for a second data collection time window, a second parity block for the parity data of the first plurality of peer video cameras;
sending, by the parity video camera, the second parity block to the first target peer video camera; and
sending, by the parity video camera, a video data chunk from the first target peer video camera in the second data collection time window to a second target peer video camera in the first plurality of peer video cameras.

19. The computer-implemented method of claim 11, further comprising, for a plurality of data collection time windows:
determining the parity video camera for a first camera group comprising the first plurality of peer video cameras and the parity video camera;
determining parity blocks for the first camera group;
distributing the parity blocks among video cameras in the first camera group; and
distributing, based on distributing a parity block to a video camera in the first camera group, backup data for a video data block of that video camera to a different video camera in the first camera group.

20. A video camera, comprising:
at least one image sensor configured to capture video images;
a network interface configured for communication with a first plurality of peer video cameras over a network;
a non-volatile memory configured to store source video data captured by the at least one image sensor;
means for determining a chunk synchronization event signaling an end of a data collection time window;
means for receiving, responsive to the chunk synchronization event, peer video data from the first plurality of peer video cameras, wherein the peer video data includes video data chunks corresponding to video stream data generated by each peer video camera during the data collection time window;
means for determining, based on the video data chunks from the peer video cameras for the data collection time window, parity data for a parity chunk; and
means for storing the parity data in the non-volatile memory.

* * * * *